US009992018B1

(12) United States Patent
Tjew

(10) Patent No.: US 9,992,018 B1
(45) Date of Patent: Jun. 5, 2018

(54) GENERATING CRYPTOGRAPHIC CHALLENGES TO COMMUNICATION REQUESTS

(71) Applicant: Electronic Arts Inc., Redwood City, CA (US)

(72) Inventor: Kat Fung Tjew, Burnaby (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 257 days.

(21) Appl. No.: 15/080,408

(22) Filed: Mar. 24, 2016

(51) Int. Cl.
*H04L 29/06* (2006.01)
*H04L 9/08* (2006.01)
*H04L 9/06* (2006.01)

(52) U.S. Cl.
CPC .......... *H04L 9/0861* (2013.01); *H04L 9/0643* (2013.01)

(58) Field of Classification Search
CPC ....... H04L 9/0861; H04L 9/0643; H04L 9/32; H04L 9/3271
See application file for complete search history.

(56) References Cited

U.S. PATENT DOCUMENTS

| 6,769,016 | B2 | 7/2004 | Rothwell et al. |
| 7,974,849 | B1 | 7/2011 | Begole et al. |
| 8,589,174 | B2 * | 11/2013 | Nelson ................... G06Q 50/22 705/2 |
| 8,881,266 | B2 * | 11/2014 | Chow ..................... G06F 21/31 713/168 |
| 9,231,936 | B1 * | 1/2016 | Wang ....................... H04L 63/08 |
| 9,529,777 | B2 | 12/2016 | Tjew et al. |
| 2002/0165838 | A1 | 11/2002 | Vetter |
| 2004/0039630 | A1 | 2/2004 | Begole et al. |
| 2006/0036727 | A1 | 2/2006 | Kurapati et al. |
| 2007/0043851 | A1 | 2/2007 | Yellamraju et al. |
| 2007/0121596 | A1 | 5/2007 | Kurapati et al. |
| 2007/0266394 | A1 | 11/2007 | Odent et al. |
| 2008/0209544 | A1 * | 8/2008 | Kempka ............... G06F 21/445 726/17 |
| 2009/0164788 | A1 * | 6/2009 | Cho ...................... H04L 63/061 713/175 |
| 2011/0012603 | A1 | 1/2011 | Bose et al. |
| 2011/0167269 | A1 * | 7/2011 | Baykal ................. H04L 63/061 713/169 |
| 2012/0047578 | A1 * | 2/2012 | Lee ......................... G06F 21/57 726/22 |

(Continued)

OTHER PUBLICATIONS

Alex Beutel, Wanhong Xu, Venkatesan Guruswami, Christopher Palow, and Christos Faloutsos. "Copycatch: stopping group attacks by spotting lockstep behavior in social networks." In WWW, pp. 119-130. ACM, 2013.

(Continued)

*Primary Examiner* — Hadi S Armouche
*Assistant Examiner* — Sher A Khan
(74) *Attorney, Agent, or Firm* — Knobbe, Martens, Olson & Bear, LLP

(57) ABSTRACT

Embodiments of a system or method useful in forcing a computing system to perform a target amount of computations is disclosed. The actual amount of computations may vary from the target amount to within a selected maximum variation. Embodiments of the system or method involve generating a cryptographic challenge to which the computing system needs to compute a response to validate a request from the computing system.

15 Claims, 13 Drawing Sheets

(56) References Cited

U.S. PATENT DOCUMENTS

| | | | |
|---|---|---|---|
| 2012/0137367 A1 | 5/2012 | Dupont et al. | |
| 2013/0111019 A1 | 5/2013 | Tjew et al. | |
| 2016/0110528 A1* | 4/2016 | Gupta | G06F 21/31 726/19 |
| 2016/0191654 A1* | 6/2016 | Healey | H04L 67/306 709/228 |
| 2017/0098067 A1* | 4/2017 | Paluri | G06F 21/36 |

OTHER PUBLICATIONS

Bokai Cao, Francine Chen, Dhiraj Joshi, and Philip S Yu. "Inferring crowd-sourced venues for tweets." IEEE Big Data, pp. 639-648. IEEE, 2015.

Bokai Cao, Xiangnan Kong, and Philip S Yu. "Collective prediction of multiple types of links in heterogeneous information networks." In ICDM, pp. 50-59. IEEE, 2014.

Qiang Cao, Michael Sirivianos, Xiaowei Yang, and Tiago Pregueiro. "Aiding the detection of fake accounts in large scale social online services." In NSDI, pp. 197-210, 2012.

William Eberle and Lawrence Holder. "Discovering structural anomalies in graph-based data." ICDMW, pp. 393-398. IEEE, 2007.

Jing Gao, Feng Liang, Wei Fan, Chi Wang, Yizhou Sun, and Jiawei Han. "On community outliers and their efficient detection in information networks." In KDD, pp. 813-822. ACM, 2010.

Saptarshi Ghosh, Bimal Viswanath, Farshad Kooti, Naveen Kumar Sharma, Gautam Korlam, Fabricio Benevenuto, Niloy Ganguly, and Krishna Phani Gummadi. "Understanding and combating link farming in the twitter social network." In WWW, pp. 61-70. ACM, 2012.

Manish Gupta, Jing Gao, Xifeng Yan, Hasan Cam, and Jiawei Han. "On detecting association-based clique outliers in heterogeneous information networks." In ASONAM, pp. 108-115. IEEE, 2013.

Manish Gupta, Arun Mallya, Subhro Roy, Jason HD Cho, and Jiawei Han. "Local learning for mining outlier subgraphs from network datasets." In SDM. SIAM, 2014.

Zoltán Gyöngyi, Hector Garcia-Molina, and Jan Pedersen. "Combating web spam with trustrank." In VLDB, pp. 576-587. VLDB Endowment, 2004.

Bryan Hooi, Hyun Ah Song, Alex Beutel, Neil Shah, Kijung Shin, and Christos Faloutsos. "Fraudar: Bounding graph fraud in the face of camouage." In KDD. ACM, 2016.

Ming Ji, Jiawei Han, and Marina Danilevsky. "Ranking-based classification of heterogeneous information networks." In KDD, pp. 1298-1306. ACM, 2011.

Meng Jiang, Peng Cui, Alex Beutel, Christos Faloutsos, and Shiqiang Yang. "Catchsync: catching synchronized behavior in large directed graphs." In KDD, pp. 941-950. ACM, 2014.

Nitin Jindal and Bing Liu. "Opinion spam and analysis." In WSDM, pp. 219-230. ACM, 2008.

Xiangnan Kong, Bokai Cao, and Philip S Yu. "Multi-label classification by mining label and instance correlations from heterogeneous information networks." In KDD, pp. 614-622. ACM, 2013.

Xiangnan Kong, Philip S Yu, Ying Ding, and David J Wild. "Meta path-based collective classification in heterogeneous information networks." In CIKM, pp. 1567-1571. ACM, 2012.

Chao Liu, Xifeng Yan, Hwanjo Yu, Jiawei Han, and S Yu Philip. "Mining behavior graphs for "backtrace" of noncrashing bugs." In SDM, pp. 286-297. SIAM, 2005.

Qing Lu and Lise Getoor. "Link-based classification." In ICML, vol. 3, pp. 496-503, 2003.

Emaad Manzoor, Sadegh M Milajerdi, and Leman Akoglu. "Fast memory-efficient anomaly detection in streaming heterogeneous graphs." In KDD. ACM, 2016.

Jennifer Neville and David Jensen. "Iterative classification in relational data." In AAAI Workshop on Learning Statistical Models from Relational Data, pp. 13-20, 2000.

Jennifer Neville and David Jensen. Collective classification with relational dependency networks. In KDD Workshop on Multi-Relational Data Mining, pp. 77-91. Citeseer, 2003.

Caleb C Noble and Diane J Cook. "Graph-based anomaly detection." In KDD, pp. 631-636. ACM, 2003.

Myle Ott, Yejin Choi, Claire Cardie, and Jeffrey T Hancock. "Finding deceptive opinion spam by any stretch of the imagination." In ACL, pp. 309-319. ACL, 2011.

Bryan Perozzi and Leman Akoglu. "Scalable anomaly ranking of attributed neighborhoods." In SDM. SIAM, 2016.

Bryan Perozzi, Leman Akoglu, Patricia Iglesias Sanchez, and Emmanuel Muller. "Focused clustering and outlier detection in large attributed graphs." In KDD, pp. 1346-1355. ACM, 2014.

Prithviraj Sen, Galileo Namata, Mustafa Bilgic, Lise Getoor, Brian Galligher, and Tina Eliassi-Rad. "Collective classification in network data." AI magazine, 29(3):93, 2008.

Neil Shah, Alex Beutel, Brian Gallagher, and Christos Faloutsos. "Spotting suspicious link behavior with fbox: An adversarial perspective." In ICDM, pp. 959-964. IEEE, 2014.

Yizhou Sun, Jiawei Han, Xifeng Yan, Philip S Yu, and Tianyi Wu. "PathSim: Meta path-based top-K similarity search in heterogeneous information networks." In VLDB, 2011.

Yizhou Sun, Yintao Yu, and Jiawei Han. "Ranking-based clustering of heterogeneous information networks with star network schema." In KDD, pp. 797-806. ACM, 2009.

Baoning Wu, Vinay Goel, and Brian D Davison. "Propagating trust and distrust to demote web spam." MTW, 190, 2006.

"Blizzard Entertainment Uses Spyware to Verify EULA Compliance", Schneier on Security, posted Oct. 13, 2005, retrieved Aug. 14, 2015, http://www.schneier.com/blog/archives/2005/10/blizzard_entert.html, 25 pgs.

Cao, Qiang, et al. "Aiding the Detection of Fake Accounts in Large Scale Social Online Services", http://www.usenix.org/system/files/conference/nsdi12/nsdi12-final42_2.pdf, accessed Aug. 6, 2015, 14 pgs.

Ward, Mark, "Warcraft Game Maker in Spying Row", BBC News, published Oct. 31, 2005, retrieved Aug. 14, 2015, 1 pg.

* cited by examiner

GENERATING CRYPTOGRAPHIC CHALLENGES TO COMMUNICATION REQUESTS

BACKGROUND

Video games have increased in popularity and complexity in recent years. Today's video games have many more features and can sometimes be much more difficult than video games of the past. Many users enjoy the challenge of today's difficult video games. Furthermore, rewards can provide motivation to many users and can help maintain their interest in the games. These rewards may have value in the gaming environment or in the real world. However, some users may exploit a reward system offered by a video game in order to cheat and gain rewards illegitimately. A user that cheats can gain an unfair advantage over users who play by the rules, disturb the economic balance within game applications, and cheat game providers out of their resources. This can result in a degraded experience for legitimate players do not engage in illegitimate activities.

SUMMARY OF EMBODIMENTS

The systems, methods, and devices of this disclosure each have several innovative aspects, no single one of which is solely responsible for the all of the desirable attributes disclosed herein.

In one embodiment, a system comprising a data store configured to store computer-executable instructions; a communication component for communicating over a communication network with a client computing device; and at least one processor, wherein the computer-executable instructions, when executed, configure the at least one processor to receive a request from the client computing device through the communication network; in response to the request, generate an ordered plurality of secret keys; generate a ordered plurality of messages; generate an ordered plurality of message authentication codes, wherein each message authentication code is generated from a corresponding key of the plurality of secret keys and a corresponding message of the plurality of messages, wherein each message after the first message is generated based at least in part on a secret key of the plurality of secret keys used to generate a previous message authentication code of the plurality of ordered message authentication codes; generate a cryptographic challenge, wherein the cryptographic challenge comprises a first message and the ordered plurality of message authentication codes; transmit the cryptographic challenge to the client computing device through the communication network; receive a challenge response to the cryptographic challenge from the client computing device through the communication network; determine whether the challenge response includes at least a determined secret key of the ordered plurality of secret keys used to generate a determined message authentication code of the ordered plurality of message authentication codes; transmit a request response to the request to the client computing device through the communication network based, at least in part, on a result of the determination.

In another embodiment, a computer-implemented method comprising receiving a request from the client computing device through a communication network; in response to the request, generating a plurality of secret keys; generating a plurality of messages; generating a plurality of message authentication codes, wherein each message authentication code is generated from a corresponding key of the plurality of keys and a corresponding message of the plurality of messages, wherein each message after the first message is generated based at least in part on a secret key of the plurality of secret keys used to generate a previous message authentication code of the plurality of message authentication codes; generating a cryptographic challenge, wherein the cryptographic challenge comprises a first message and the plurality of message authentication codes; transmitting the cryptographic challenge to the client computing device through the communication network; receiving a challenge response to the cryptographic challenge from the client computing device through the communication network; determining whether the challenge response includes at least a determined secret key of the ordered plurality of secret keys used to generate a determined message authentication code of the ordered plurality of message authentication codes; transmitting a request response to the request to the client computing device through the communication network based, at least in part, on a result of the determination.

In another embodiment, a non-transitory computer readable medium comprising computer-executable instructions that, when executed by a computing system, cause the computing system to receive a request from the client computing device through a communication network; in response to the request, generate a cryptographic challenge, wherein the cryptographic challenge comprises a first message and a plurality of message authentication codes, wherein each message authentication code is generated from a corresponding secret key of a plurality of secret keys and a corresponding message of a plurality of messages, wherein each message after the first message is generated based at least in part on a secret key of the plurality of secret keys used to generate a previous message authentication code of the plurality of message authentication codes; transmit the cryptographic challenge to the client computing device through the communication network; receive a challenge response to the cryptographic challenge from the client computing device through the communication network; determine whether the challenge response includes at least a determined secret key of the ordered plurality of secret keys used to generate a determined message authentication code of the ordered plurality of message authentication codes; transmit a request response to the request to the client computing device through the communication network based, at least in part, on a result of the determination.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

A system or method useful in forcing a computing system to perform a target amount of computations is disclosed. The actual amount of computations may vary from the target amount to within a selected maximum variation. The system or method involves generating a cryptographic challenge to which the computing system needs to compute a response to validate a request from the computing system.

Throughout the drawings, reference numbers are re-used to indicate correspondence between referenced elements. The drawings are provided to illustrate embodiments of the subject matter described herein and not to limit the scope thereof.

DETAILED DESCRIPTION

Figure 1:
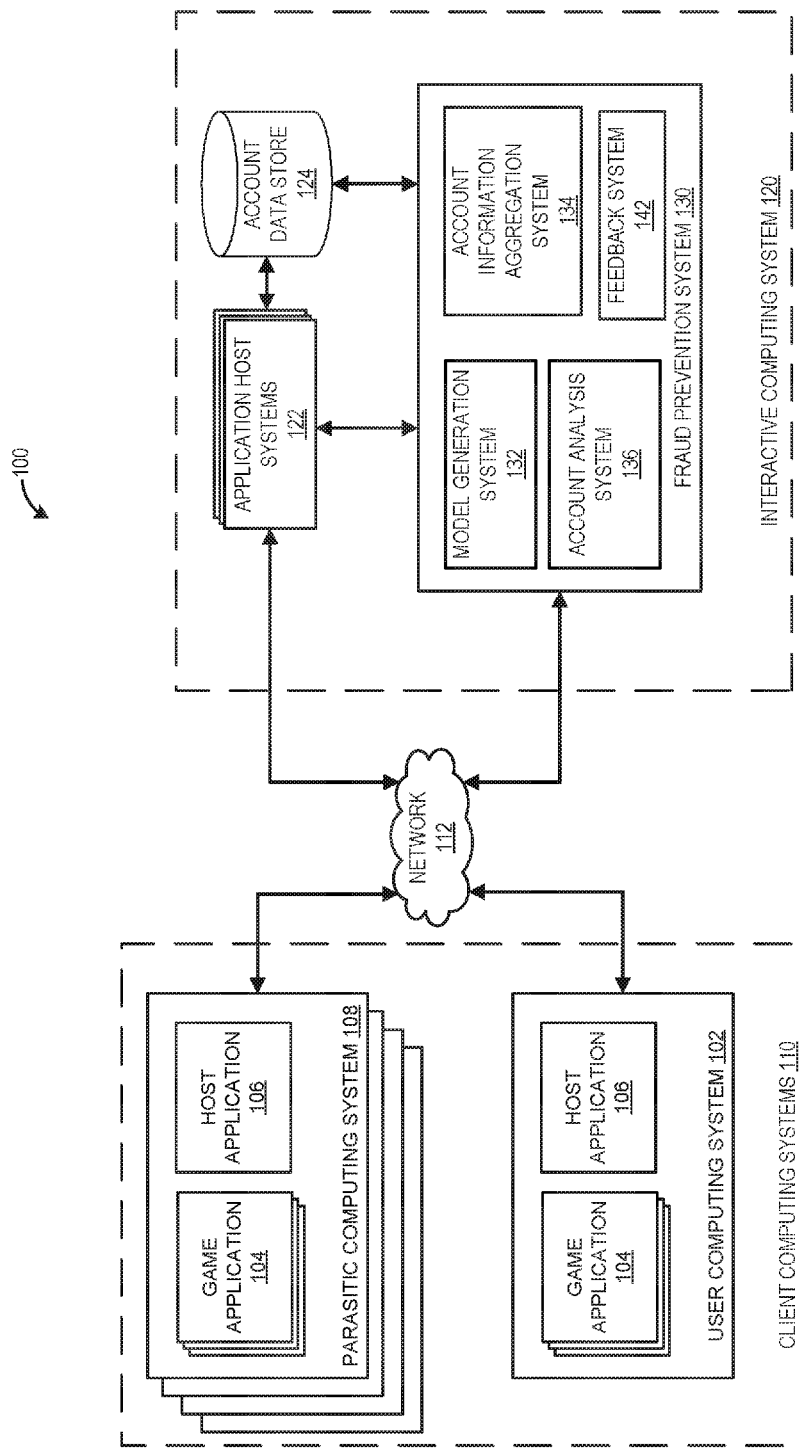
FIG. 1 illustrates an embodiment of a networked computing environment that can implement one or more embodiments of a fraud prevention system.

In a computer gaming environment, a game provider may provide a reward to users who complete a game or achieve a specified level in the game. A legitimate user playing by the rules may send a request for a reward only after having completed the game or achieved the specified level in the game. A game provider may supply the content for a request only after receiving a verification that a game has been completed or a specified level in the game has been achieved. Some games may be installed locally on a user's computing or gaming system. In such instances, it may not be feasible for a game provider to directly verify that a user requesting a reward has actually completed the game or achieved the specified level in the game. Instead, a game provider may indirectly verify a user's completion or achievement. For example, if a game is expected to take at least one minute to complete, and consecutive requests for a reward are received from the same user account (or another identifier representing one user, for example, the same gaming system ID, the same IP address, or the like) in less than one minute, a game provider may deny a request for a reward as likely being illegitimate (in the sense of not submitted after meeting the condition for a reward). As another example, a game provider may require a request for a reward associated with achieving the Nth level in a game be accompanied with a defined value (for example, the N-thousandth decimal place of the number Pi). A game provider may deny a request which is not accompanied by the expected value.

These forms of verification, however, may be overcome by a user who intends to exploit the reward system. For example, a user may determine the expected value associated with a request for completing a certain game and could send in multiple requests with the expected value. This can enable a user to claim rewards multiple times without having completed the game a single time. Additionally, if the verification is based on a user account, an illegitimate user may create a plurality of user accounts and claim rewards at a much faster rate. For example, if a user creates 10,000 accounts and submits a request for a reward for each account every one minute (the time limit per user account used in the illustration above), the user may obtain 10,000 rewards instead of one every minute. In many gaming systems, there is little or no cost associated with creating user accounts. Thus, a user may multiply his illegitimate rewards simply by creating multiple user accounts. To accomplish this using one gaming system, the illegitimate user may run multiple instances of games on one gaming system, each instance may be associated with a user account. As another example, if the verification is based on a gaming system ID, an illegitimate user may use a plurality of gaming systems and use each system to submit requests for rewards. In this manner, an illegitimate user may claim rewards at a rate which is the normal legitimate rate multiplied by the number of gaming systems the user can exploit. A verification based on IP addresses may be similarly compromised. A constant value (for example, the N-thousandth decimal place of the number Pi), once computed, may be used repeatedly since its value does not change. Whether using multiple user accounts or multiple gaming systems, an illegitimate user ultimately can gain possession of all the rewards that he obtains. Using one or more computing or gaming systems, an illegitimate user may send requests for rewards at thousands times (or more) the normal legitimate rate, or even thousands of requests every second. Even if each reward is only worth pennies in real money, for instance, an illegitimate gamer may acquire a significant amount of ill-gotten rewards through his exploits.

The present disclosure provides embodiments of a fraud prevention system which can force a user system to spend a target amount of time or computing resources to perform computations for each request for a reward. The fraud prevention system may grant a request for a reward only if the user system can supply the correct result from the computations. It can also be advantageous in some embodiments for the fraud prevention system to spend much less computing resources to generate the problem or challenge than it will take for a user system to compute a response. Additionally, it can be advantageous in some embodiments for the system to reduce shortcuts or work-arounds that the target may be able to exploit when responding to the challenge. Furthermore, it can be advantageous, in some embodiments, for such a system to determine the amount of time or computing resources which may be required based on a likelihood of whether a user system is illegitimate. An illegitimate user system or account can be referred to as a parasitic system or account. Embodiments of the fraud prevention system can advantageously set the target amount of work (for example, the cost in computing resources of computing and sending a valid response) such that it can become unrewarding for a user to attempt to gain rewards illegitimately, without negatively impacting legitimate users. For example, the system may identify legitimate user systems which may be forced to spend much less computing resources on computations in order to generate a valid response than an illegitimate user. A legitimate user system or account can be referred to as a verified system or account.

I. Overview of Fraud Detection System

FIG. 1 illustrates an embodiment of a computing environment 100 for implementing a fraud prevention system 130. The environment 100 includes a network 112, a plurality of client computing systems 110, which includes user computing systems 102 and parasitic computing systems 108, and an interactive computing system 120. The interactive computing system 120 includes application host systems 122, an account data store 124, and a fraud prevention system 130. To simplify discussion and not to limit the present disclosure, FIG. 1 illustrates only one user computing system 102, a plurality of parasitic computing systems 108, and one interactive computing system 120, though multiple systems may exist in the computing environment 100. The user computing system 102 may communicate via a network 112 with the interactive computing system 120. Although only one network 112 is illustrated, multiple distinct and/or distributed networks 112 may exist.

A. User Computing Systems

The user computing system 102 may include hardware and software components for establishing communications over a communication network 112. For example, the user systems 102 may be equipped with networking equipment and network software applications (for example, a web browser) that facilitate communications via one or more networks (for example, the Internet or an intranet). The user computing system 102 may have varied local computing resources such as central processing units and architectures, memory, mass storage, graphics processing units, communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 102 may include one or more of the embodiments described below in connection with FIG. 12.

Typically, the user computing system 102 is capable of executing a game application 104, such as a video game, that may be stored and/or executed locally on the user computing system 102 or in a distributed environment. For example, the user computing system 102 may execute a portion of a game; the interactive computing system 120, or an application host system 122 of the interactive computing system 120, may execute another portion of the game. For instance, the game may be a massively multiplayer online role-playing game (MMORPG) that includes a client portion executed by the user computing system 102 and a server portion executed by one or more application host systems 122. For the present discussion, the application can include a distributed application or an application that includes a portion that executes on the user computing system 102 (such as sending a request) and a portion that executes on at least one of the application host systems 122 (such as responding to a user request). The user computing system 102 may execute a host application 106. The host application 106 can be loaded into memory on the user computing system 102 and can act as an interface or hub for one or more game applications 104 that interface with the application host system 122. The game application 104 and/or host application 106 may contain a module or an instruction set used to derive a response to a cryptographic challenge according to the present disclosure.

B. Parasitic Computing Systems

The parasitic computing systems 108, which also may be referred to as a bots or illegitimate computer systems, can include one or more computing systems. The parasitic computing systems can function the same as user computing system 102. The parasitic computing systems 108 may execute the game application 104 and/or the host application 106, or may emulate some of the functions, processes, and/or actions of these applications (for example, sending requests for rewards). The parasitic computing systems 108 can communicate with the interactive computing system 120 through the network 112. A user may direct one or more parasitic computing systems 108 to send requests for rewards to the interactive computing system 120. The parasitic computing systems 108 may send requests for rewards without meeting the requirement for receiving the reward (for example, completing a game). The requests performed by the parasitic computing systems 108 can be in violation of agreements between users and the interactive computing system 120 for a specific game application 104. The requests may be sent at a defined time interval for such requests from one system to be treated as legitimate by the interactive computing systems 120.

C. Interactive Computing System

The interactive computing system 120 can include one or more application host systems 122, and account data store 124, and a fraud prevention system 130. The interactive computing system 120 may include one or more computing systems configured to execute a portion of the game application 104 and/or host application 106. In some embodiments, the one or more application host systems 122 can include one or more computing devices, such as servers and databases that may host and/or execute a portion of one or more instances of the game application 104 and/or host application 106.

1. Application Host System

The interactive computing system 120 may enable multiple users or computing systems to access a portion of the game application 104 and/or host application 106 executed or hosted by the interactive computing system 120. In some embodiments, the portion of the game application 104 executed by application host systems 122 of the interactive computing system 120 may create a persistent virtual world. This persistent virtual world may enable one or more users to interact with the virtual world and with each other in a synchronous and/or an asynchronous manner. In some cases, multiple instances of the persistent virtual world may be created or hosted by the interactive computing system 120. A set of users may be assigned to or may access one instance of the persistent virtual world while another set of users may be assigned to or may access another instance of the persistent virtual world. In some embodiments, the host application systems 122 may execute a hosting system for executing various aspects of a game environment. For example, in one embodiment, the game application 104 may be a competitive game, such as a first person shooter or sports game, and the host application systems 122 can provide a dedicated hosting service for hosting multiplayer game instances or facilitate the creation of game instances hosted by user computing devices. In some embodiments, the application host systems 122 can provide a lobby or other environment for users to virtually interact with one another. Such environments may include environments for conducting transactions between players, such as an auction house or a type of environment for facilitating transactions. In some embodiments, the application host system 122 can communicate with computing systems to provide responses to requests generated by a game application 104 or a host application 106 executed on a user computing system 102 or an parasitic computing system 108.

2. Account Data Store

Figure 2:
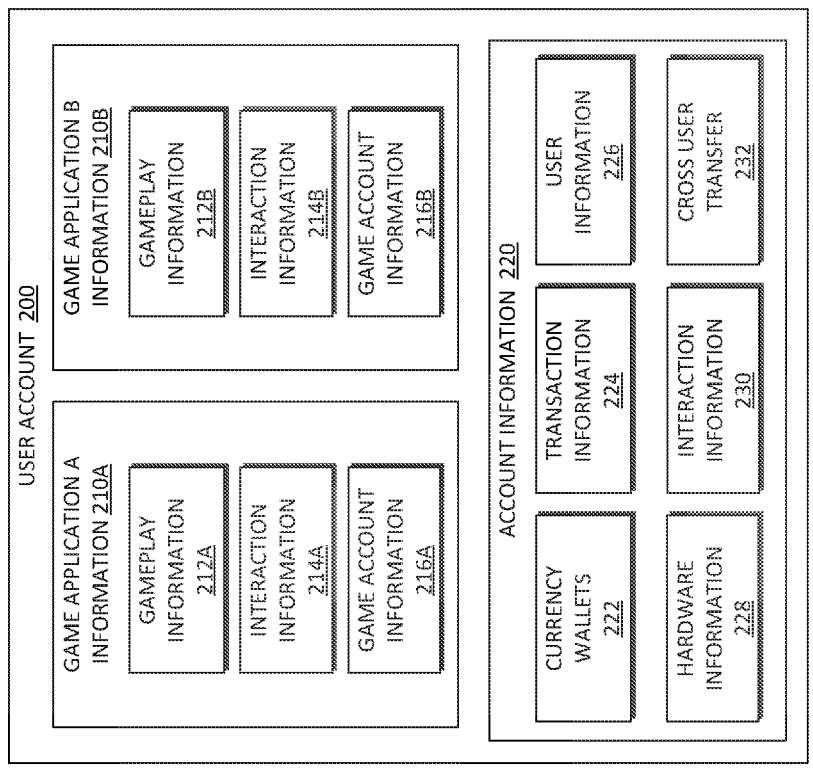
FIG. 2 illustrates an embodiment of a user account.

The interactive computing system 120 can include one or more account data stores 124 that are configured to store user account information associated with game applications hosted by the interactive computing system 120 and/or the application host systems 122. An example embodiment of user account information stored in the account data store 124 is illustrated in FIG. 2 and described below.

3. Fraud Prevention System

In the illustrated embodiment, the fraud prevention system 130 includes a model generation system 132, an account information aggregation system 134, an account analysis system 136, a quality assurance system 138, an account modification system 140, and a feedback system 142. The fraud prevention system 130 can communicate directly with user computing systems 102 and/or illegitimate computing systems 108 via the network 112. The fraud prevention system 130 can be in communication with the application host systems 122 and/or the account data store 124. Each of the systems of the fraud prevention system 130 will be described in more detail below.

a. Model Generation System

The model generation system 132 can be configured to generate one or more fraud detection models. The model generation system 132 can use one or more machine learning algorithms to determine one or more machine learning models or parameter functions. The machine learning algorithms can be configured to adaptively develop and update fraud detection models and/or electronic filters based on input data sets along with one or more desired outcome criteria. The fraud detection models can be generated using one or more machine learning algorithms based on a defined rule set associated with the algorithms. The inputs for the machine learning algorithms may include aggregated historical data received from the application host systems, fraud identification information (such as, for example, true positive and false positive indications), fraud detection rule sets, user confidence rule sets, and other inputs.

Some examples of machine learning algorithms that can be used to generate and update the fraud detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a priori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some embodiments, individual models can be customized for individual data sets. The model generation system 132 can generate the fraud detection model by determining characteristics and patterns of operation associated with a data set. In some embodiments, the model generation system 132 generates a base model. The base model may be used as a starting point to generate additional models specific to a data type, a data set, conditional situations, or other variations. In some embodiments, the model generation system 132 can be configured to utilize a plurality of techniques to generate models for analysis of the aggregated data. For example, human pattern recognition can be used to identify anomalies based on available information sources. In some embodiments, statistical methods can be employed to establish baseline thresholds that flag anomalous behaviors. Other techniques may include using a pre-defined thresholds or data values. Over time model generation system 132 can continue to update the fraud detection models.

b. Account Information Aggregation System

The account information aggregation system 134 can aggregate account information associated with user accounts within game applications. The account information aggregation system 134 can gather the data associated with each user account that is being monitored and processed. The account information aggregation system 134 can filter the information received from the game application accounts. In some embodiments, a separate account information aggregation system 134 can be associated with each game application. The account information aggregation system 134 can include a rule set that is used to determine the parameters that are used for data aggregation and filtering for a specific game application. For example, the account information aggregation system 134 can aggregate the type of user account information illustrated in FIG. 2. In one example, a user may have five different games associated with a user account and the account information aggregation system can collect information on all of the games and the user account information.

The account information aggregation system 134 can aggregate information for verified accounts. A game application may have a system that identifies user accounts that are verified to be operated by a user that is operating the user account in accordance with the terms of use of the game application, such as terms of service and/or end user license agreement. The account information aggregation system 134 can be configured to aggregate the verified account information for usage during various aspects of the fraud detection and prevention process. The verified accounts can be uses to identify the types of transactions and interactions of a legitimate user account. The account information aggregation system 134 can aggregate information associated with a user account within a game application and/or host application and provide the information to the account analysis system 136.

c. Account Analysis System

The account analysis system 136 can utilize the fraud detection model to determine confidence scores associated with user accounts. In some embodiments, a confidence score system can be implemented to establish a confidence level per player. Accounts having a confidence score above a defined threshold can be excluded from unintended restrictive measures. In some embodiments, responses to cryptographic challenges from the interactive computing system 120 according to the present disclosure can be used to verify a trusted client.

In some embodiments, the account analysis system 136 can be configured to utilize a plurality of techniques to identify parasitic accounts. For example, human pattern recognition can be used to identify suspicious accounts based on available information sources, including, but not limited to, blogs, forums, social media feeds, vendor websites, and the like. In some embodiments, statistical methods can be employed to establish baseline thresholds that flag abnormal behaviors, such as, for example, behavior that is not possible under normal gameplay, for example, consecutive requests from the same accounts at an interval less than the minimum interval for a game application. Other techniques may include using a pre-defined sequence/order of events, which can only be generated by a trusted game client.

In some embodiments, a signature and/or hidden signals can be used to verify that transactions originated from a trusted client, and/or can be used distinguish between normal and parasitic accounts. For example, in some embodiments, hidden menus can be implemented that are visible on a modified client, but not on a normal client. In such an embodiment, any request from the hidden menus provides a signal that can be used to help identify a parasitic account.

[0035] The account analysis system 136 can then individually analyze and categorize each of the user accounts. The user accounts can be categorized using the fraud detection model previously generated by the account analysis system 136. The account analysis system 136 can automatically analyze user account information, such as gameplay, user account activity, authentication, transfer and trade, purchases, and the like.

d. Feedback System

The feedback system 138 can be configured to generate feedback information that can be provided to the account analysis system 136 for further analysis. After application of the account action, a representative associated with the game application may be contacted by the user to dispute the account action applied to the account. The feedback system can be used to change the account action and can generate an error report indicating that the evaluation of the user account resulted in a false positive. The feedback system 142 can include a user interface that outputs information associated with the user account in order for a user to modify information associated with a user account, apply account-specific actions and/or report any errors in the applied account action.

D. Network

The network 112 can include any type of communication network. For example, the network 112 can include one or more of a wide area network (WAN), a local area network (LAN), a cellular network, an ad hoc network, a satellite network, a wired network, a wireless network, and so forth. In some embodiments, the network 112 can include the Internet.

II. User Account

FIG. 2 illustrates an embodiment of a user account 200 stored in account data store 124. In the illustrated embodiment, the user account includes game application information 210 related to specific game applications 104 that are associated with the user account. For example, the user account 200 may include game application A information 210A and game application B information 210B. The user account 200 can also include account information 220, which may be independent of a game application. In some embodiments, the account information 220 may be associated with a host application 106.

A. Game Information

The game application information 210 can include information specific to a specific game application 104. In the illustrated embodiment, the game application information 210 includes gameplay information 212, interaction information 214, and game account information 216.

Gameplay information 212 may include information associated with gameplay of a user within a game environment of the game. The gameplay information may include information generated during execution of the game application by a user computing system 102 or an parasitic computing system 108. For example, the gameplay information 212 may include actions performed by a character within a game environment, location of a character within the game environment, length of play time, times of day, type of interactions with in-game elements, completion of in-game events, such as achievements or quests, number of matches played during a play session, authentication information, and other types of gameplay information associated with execution of a game application 104. The type of gameplay information stored within the gameplay information 212 may be dependent upon the game application 104. For example, the gameplay information 212A may include different types of information than the gameplay information 212B.

Interaction information 214 can include information associated with interactions between users within the game application. A user can interact with multiple other users within a game application, for example, a character can send messages, converse, trade equipment, trade currency, join a party, play a multiplayer match, and engage in other types of interactions with users associated with other player accounts. The interaction information can include any type of interaction between user accounts within the game application. The types of interactions can be determined by the specific game application, for example, the types of interactions in a first person shooter game application can completely different than the types of interactions in an MMORPG game application.

Game account information 216 may include additional information associated with a game application. For example, the game account information may include user account information (such as username, display name, email domains, date of birth, answers to security questions), user authentication information (such as username and password), game profile information (such as, for example, settings of multiple in-game user profiles), saved game files, characteristics associated with in-game characters (such as, for example, character equipment, character level, achievements, and the like), or other information.

The game application information 210 for a specific game application can be can be stored in an account data store 124 associated with the specific game application 104. For example, game application A information 210A can be stored in a data store associated with game application A and game application B information 210B can be stored in a separate and distinct data store associated with game application B. In some embodiments, the game application information for different games can be stored within same data store. In some embodiments, the account information 220 can store information identifying the various locations of game application information associated with a user account.

B. Account Information

The account information 220 can store information for the user account. In the illustrated embodiment, the account information 220 includes currency wallets 222, transaction information 224, user information 226, hardware information 228, interaction information 230, and cross user transfer information 232. In some embodiments, account information 220 can be tied to a user; in other embodiments, one or more aspects of the account information can be tied to a game application.

The currency wallet information 222 may include various types of currencies that a user may have in an account. The types of currencies can include an account balance associated with real world currencies and virtual currencies. The real world currencies can be nation specific (such as dollars, pounds, euros, and the like). The virtual currencies can be for the interactive computing system 120 or specific to a game application 104. For example, a user may have virtual currency that can be used to purchase game applications provided by the interactive computing system 120. The virtual currency may be specific to a game application, such as gold, that can be used to purchase goods or services associated with a specific game application. For example, the virtual currency may be used to purchase an in-game character, item, game account time, and the like. In some embodiments, the virtual currency can be earned by playing the game or by purchasing the currency with real world currency through the interactive computing system 120. A reward as described in the present disclosure may be in the form of real world or virtual currencies.

The transaction information 224 can include information associated with transactions of a user account, relating to virtual and/or real world currencies. The transaction information 224 may include, for example, credit card information, timing of the transactions, value of the transactions, speed of transactions, frequency of the transactions, location of the transactions, type of transactions, and the like. The transactions could be for the purchase of goods or services offered by the interactive computing system 120 or for transactions between users within the host application 106 and/or game applications 104.

User information 226 can include information associated with the user of a user account such as name, phone number, address, e-mail address, credit card information, date of birth, username, password, display name, answers to security questions, and the like. The user information 226 may include additional information associated with the user account, such as identification of game applications associated with a user account, identification of game modes within game applications that a user is entitled to, identification of items that are associated with the account (such as account bound items), a user handle associated with the user account, and other information that can be identify game applications associated with the account.

Hardware information 228 can include information associated with user computing systems 102 or an parasitic computing system 108 associated with a user account. The hardware information can be provided by the user or obtained by the host application systems 122 and/or the interactive computing system 120. For example, in some embodiments, a human agent can analyze the user computing system and provide the information to the interactive computing system 120. The hardware information can include hardware information associated with the operation of the user computing system (such as, for example, processor speed, memory type, and the like), network information (such as, for example, IP address, MAC address), and/or other information associated with the user computing system 102 or an parasitic computing system 108. Hardware information 228 such as processor speed may be used to estimate the length of time a user computing system 102 or an parasitic computing system 108 is expected to perform a target amount of computation.

Interaction information 230 can include interactions with other users which may be external to interactions within a game application 104. For example, the interactive computing system 120 may include a chat system that allows users to communicate external to the operation of a game application. The interactive computing system 120 may include an auction house or other system that permits trading and other actions that can be performed between user accounts.

Cross user transfer information 232 can include the transfer of game accounts between user accounts. A user account associated with game application A on one user account may be transferred to a different user account. For example, a user account may wish to consolidate multiple user accounts associated with different game applications into a single user account. The cross user transfer information 232 can maintain transfer history identifying all user accounts that were associated with a specific game application account.

III. Fraud Detection Model Generation

Figure 3:
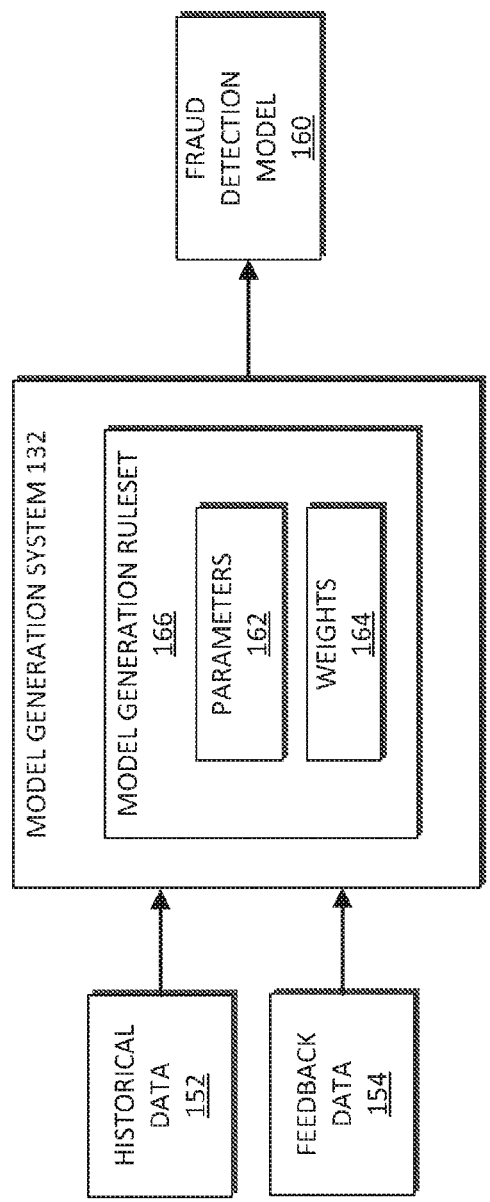
FIG. 3 illustrates a block diagram an embodiment a model generation system for generation of a fraud detection model.

FIG. 3 illustrates an embodiment of a model generation system 132 configured for the generation of a fraud detection model 160. The model generation system can generate a fraud detection model 160 based, at least in part, on inputs received from the account information aggregation system 134 and/or the feedback system 142. The input information can include historical data 152, feedback data 154, and/or other input data for use by the model generation system 132 to generate the fraud detection model 160.

The historical data 152 can include data received from one or more data sources, such as, for example, an application host system 122 and/or the account data store 124. The historical data 152 can include data from different application host systems 122, different data sources, different data types, and any data generated by the application host systems. In some embodiments, the historical data 152 may include a very large number of data points, such as millions of data points, aggregated by the account information aggregation system 134. In some embodiments, depending on the fraud detection model being generated, the historical data 152 may be filtered to include a subset of the total available data. For example, the historical data may only include data of one or more defined data types in accordance with a model generation rule set 166.

The feedback data can include an indication of whether a fraudulent event was a true positive or a false positive. A true positive indicates that the account analysis system 136 correctly detected a fraudulent event in a data set. A false positive indicates that the account analysis system 136 incorrectly identified a fraudulent event in a data set.

The model generation system 132 may generally include a model generation rule set (or "ruleset") 166 for generation of the fraud detection model 160. The rule set 166 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The fraud detection model 160 and/or the respective parameters 162 of the fraud detection models 160 may be derived during a training process based on particular input data, such as the historical data 152 and/or feedback data 154, and defined output criteria used for training purposes. The model generation rule set 166 can define the specific machine learning rules and/or algorithms the model generation system 132 uses to generate the model based on a defined objective function, such as detecting data associated with fraudulent events. In some embodiments, initial parameters 162 and weights 164 can be manually provided during the initiation of the model generation process. The parameters 162 and weights can be updated and modified during the model generation phase to generate the fraud detection model 160.

The model generation system 132 can filter and categorize the data sets according to various characteristics and parameters of the data. For example, the data can be categorized by the data source (such as, for example, game application data or host application data), information type (such as, for example, gameplay information, transaction information, interaction information, game account information), or other categories associated with the data. The model generation system 132 can filter the information to identify the information for further processing. In some embodiments, the model generation system 132 is configured to filter and separate the data sets into defined data tables comprising a plurality of data sets before further processing.

The model generation system 132 can identify information associated with the data that is relevant to identifying patterns and trends. The fraud detection model 160 can be configured to determine a confidence score associated with a user account and/or a client computing system. The confidence score can be indicative of whether the user account or client computing system is legitimate or parasitic. Additionally, the confidence score may be associated with one or more thresholds for categorizing the type of account or computing system. In some embodiments, the model generation system 132 can generate a plurality of fraud detection models 160.

After the fraud detection model 160 has been generated, the model can be used during runtime of the fraud detection system for real-time or near real-time determination of a confidence score associated with a user account and/or client computing device. For example, when a user account and/or client computing device communicates with the interactive computing system, the fraud detection model can be used to determine a confidence score with the user account and/or client computing device.

The confidence score associated with a client may be increased if the client sends requests no more frequently than the expected interval of time in light of the expected amount of computations the client is expected to perform to generate a response to a cryptographic challenge. On the other hand, if a client sends requests more frequently than expected, the confidence level associated with the client may be decreased. Timing information associated with requests from a client may be included in transaction information 224. Information on length of intervals between requests may become part of historical data 152. As another example, if requests are received from multiple client within an IP range or with the same IP address, the confidence level associated the client within the IP range may be decreased. A device ID may be similarly used to track a client computing system 110. A client authenticated through a two-phase authentication process may be assigned a higher confidence level. A two-phase authentication process may involve, for example, a password and a telephone number. Other information in user information 226 may also be used in two-phase or multi-phase authentication. A client that has successfully passed one or more human verification tests may be assigned a higher confidence score. A server may initiate a human verification test to determine or adjust the confidence level of a client. The confidence level may be derived from one or a combination of the factors mentioned above and may incorporate additional factors. The confidence score may be represented by a numerical score.

IV. Embodiments of a Challenge/Response Communication Process

Figure 4:
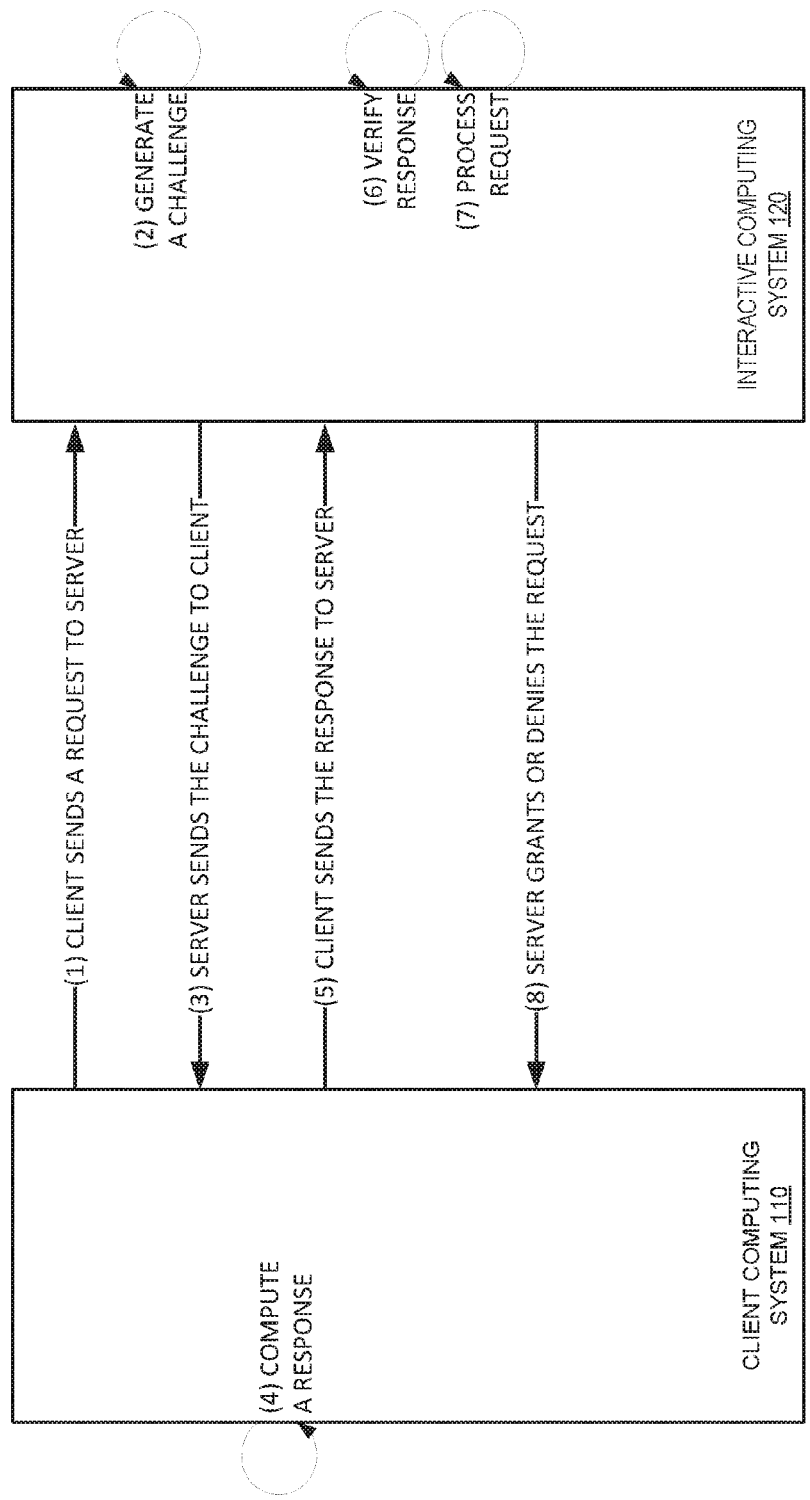
FIG. 4 illustrates an exemplary process of client/server interaction according to one embodiment of the present disclosure.

FIG. 4 illustrates an exemplary embodiment of communication interactions between a client computing system 110 and an interactive computing system 120 based on a user-initiated request. The client computing system 110 may be a user computing system 102 or an parasitic computing system 108 as shown in FIG. 1. An interactive computing system 120 may not be able to distinguish an parasitic computing system 108 from a user computing system 102. The client computing system 110 may be referred to as a client. The interactive computing system 120 may be referred to as a server. To prevent granting requests to one or many illegitimate computing systems 108, the server may employ a challenge/response process, some embodiments of which are described below.

At (1), the client may initiate communication by sending a request to the server. This request may be for a reward can include identification information associated with a user account or computing system, achievement, authentication, or other type of communication with the server. For example, the user may be requesting a reward for completing an in-game objective. This request may not be latency sensitive, in which case, some delay in response time can be acceptable or tolerable.

At (2), after receiving the request, the server can generate a cryptographic challenge, an embodiment of which is described below in connection with FIG. 7. In some embodiments, in generating the challenge the server can use identification information associated with the client to determine the confidence score associated with the client and decide on the appropriate challenge.

At (3), the server then can send the cryptographic challenge to the client. At (4), the client then can compute a response to the cryptographic challenge, an embodiment of which is described below in connection with FIG. 8. After computing a response, at (5), the client can send the response to the server. At (6), after receiving the response, the server can determine whether the response is correct. If the response is correct, at (7), the server can process and grant the request that the client sent at (8). If the response is not correct, at (7), the server may process and deny the request from the client at (8).

Figure 5A:
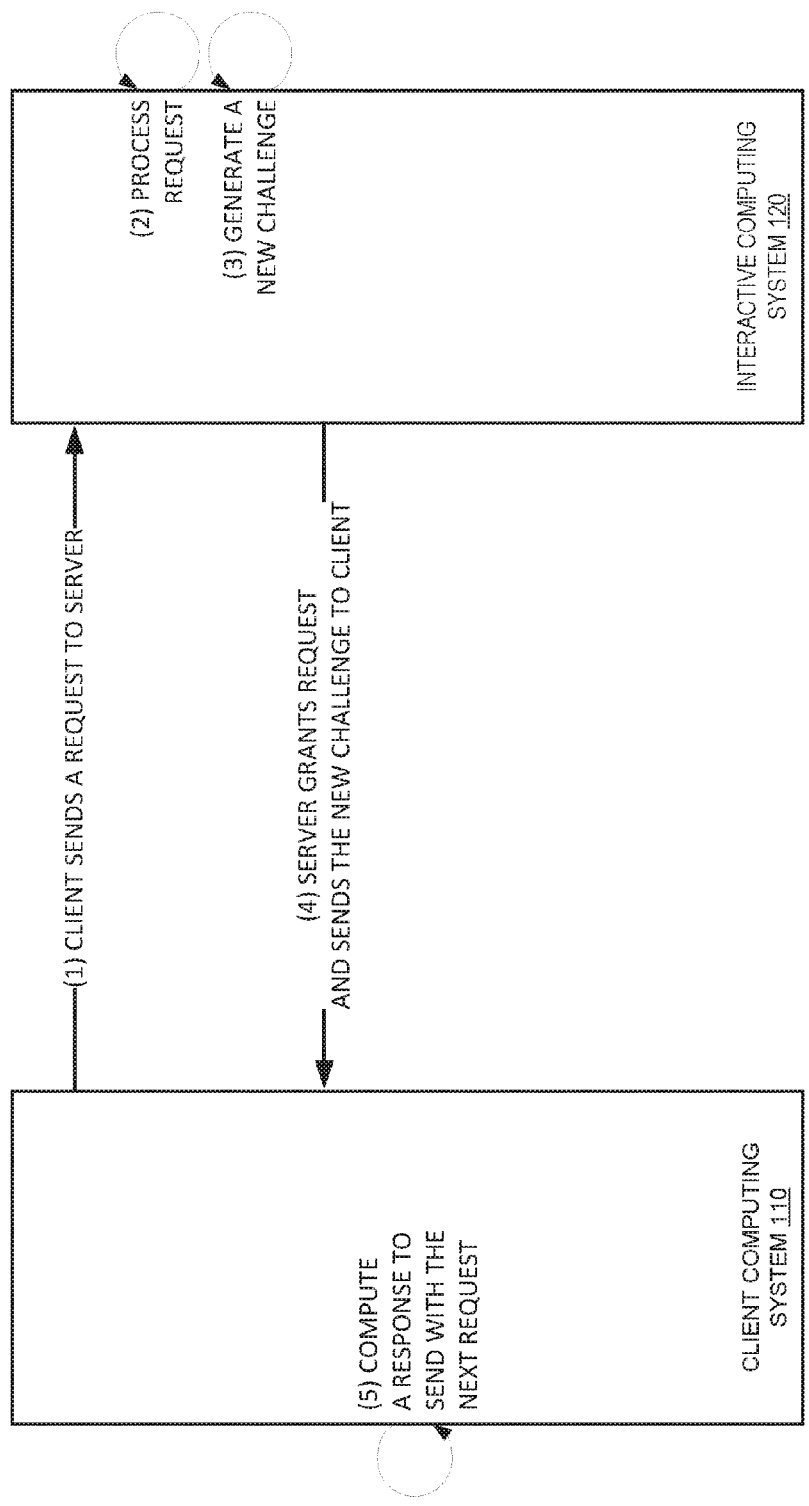
FIGS. 5A and 5B illustrate an exemplary process of client/server interaction according to another embodiment of the present disclosure.
Figure 5B:
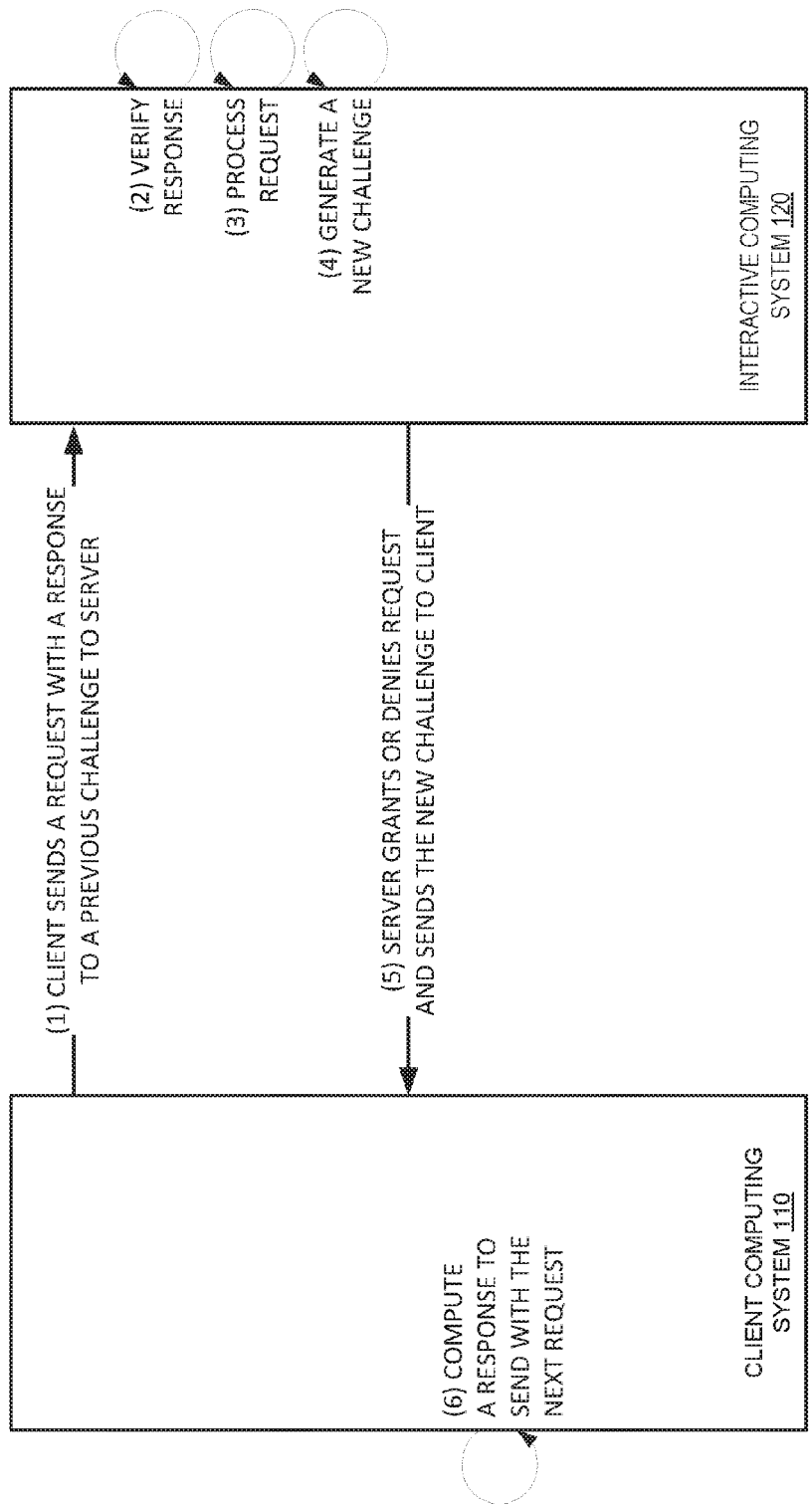

FIGS. 5A and 5B illustrate another exemplary embodiment of a challenge/response communication process between a client computing system 110 and an interactive computing system 120. FIG. 5A illustrates interactions for an initial request by a user. FIG. 5B illustrates interactions for subsequent requests by the user.

With reference to FIG. 5A, at (1), the client can send the initial request to the server. After receiving the request at (2), the server may process the request and, at (3), can generate a cryptographic challenge. At (4), the server may then grant the request and send the cryptographic challenge to the client. After receiving the challenge at (5), the client may compute a response to the challenge to send with the next request. The flow then continues with FIG. 5B.

In FIG. 5B at (1), when the client sends a subsequent request to the server, the client can send the request together with the response to the previous challenge the client has calculated. After receiving the request with a response at (2), the server can verify the response to the previous challenge, process the request at (3), and generate a new challenge at (4). If the response is correct, the server may grant the request. If the response is not correct, the server may deny the request. Regardless of whether the request is granted or denied at (5), the server may send a new challenge to the client together with a grant or denial to the request. Upon receiving the new cryptographic challenge at (6), the client may compute a response to the new challenge to send with the next request. The flow continues within FIG. 6 for subsequent requests from the same client computing system 110.

The communication process illustrated in FIGS. 5A and 5B may reduce a perceived latency by a user. In the communication protocol illustrated in FIG. 4, a client computes a response between sending a request and receiving a grant or denial to the request. In FIGS. 5A and 5B, on the other hand, a client can compute a response in the background between subsequent requests to the server.

The process in FIGS. 5A and 5B may be configured to grant the initial request from the client, which could result in providing an initial reward without requiring a response to a challenge. The server may be configured to use the challenge/response process for certain types of interactions between the client and the server. For example, an initial request may be a user login request. Thus, always granting an initial request from a client does not necessarily lead to handing out a reward without verifying the legitimacy of a client computing system 110. Even when an initial request contains a request for a reward, granting the request without verifying a response to a challenge may not present a significant disadvantage because subsequent requests would require a response to the challenge, which could reduce the number of grants of requests from parasitic computing systems 108.

VI. Generating Cryptographic Challenges

Figure 6:
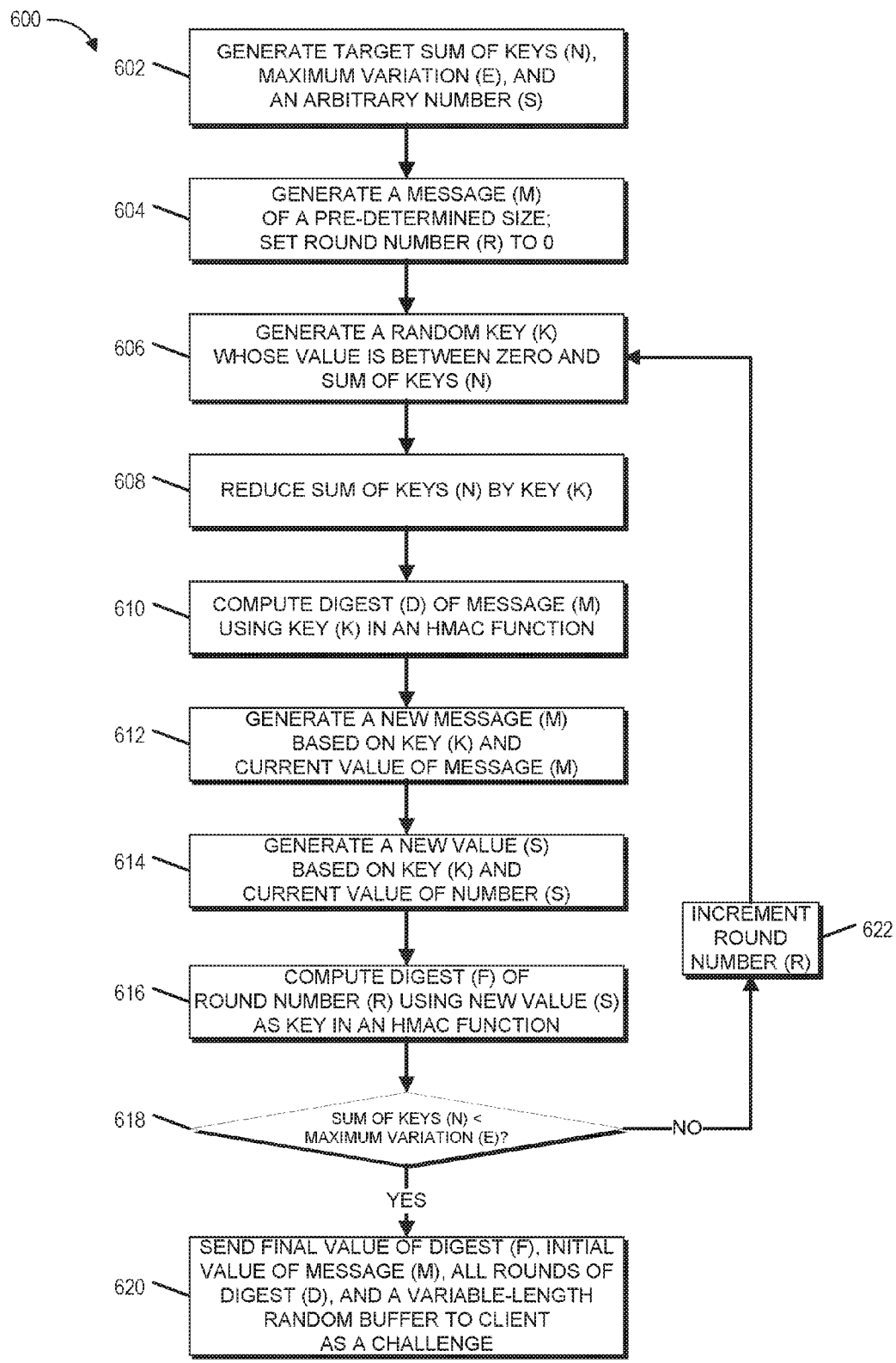
FIG. 6 illustrates an embodiment of a process for generating a challenge by a server.
Figure 7:
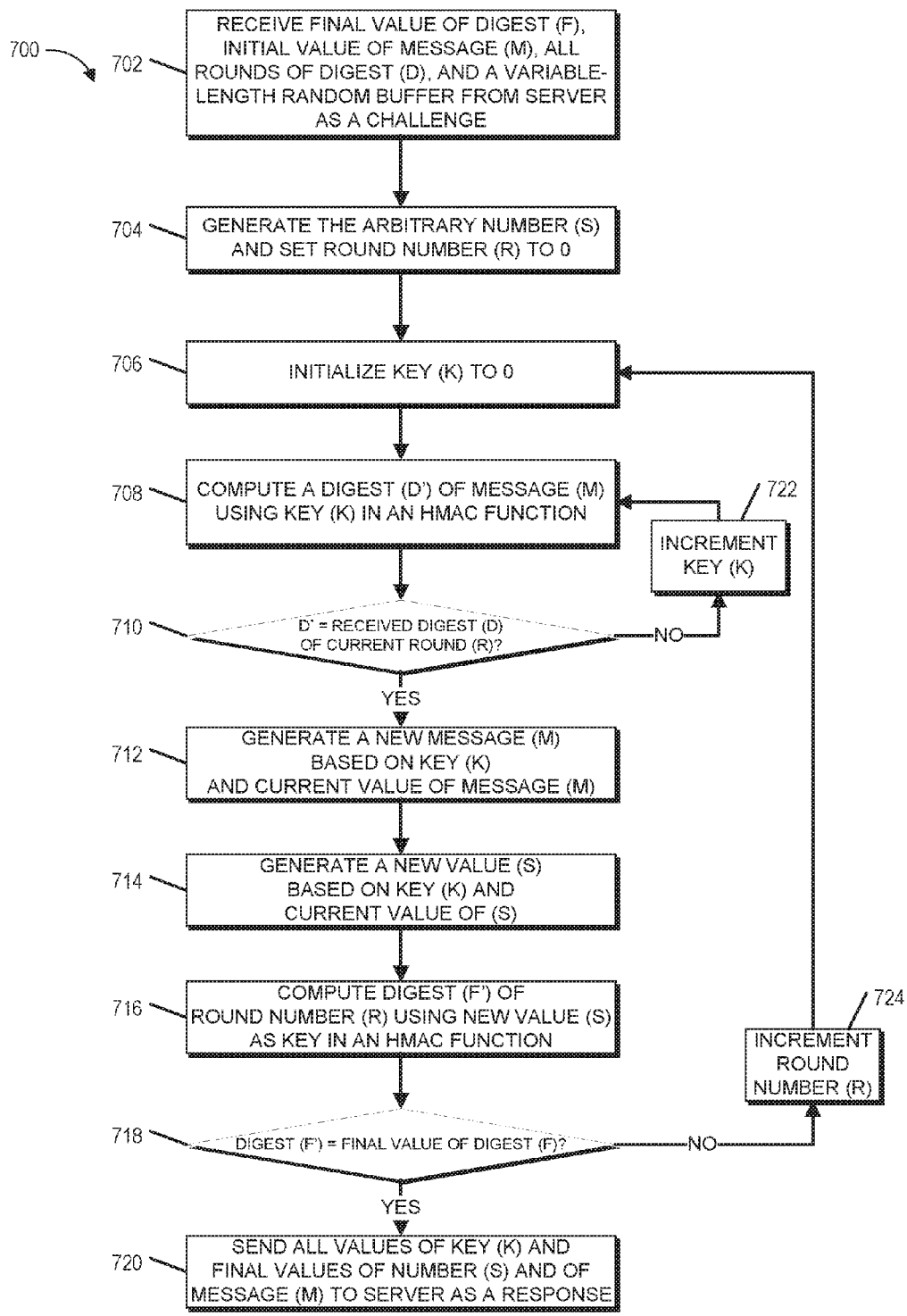
FIG. 7 illustrates an embodiment of a process for generating a response by a client.

Exemplary embodiments of a challenge response process using message authentication codes is illustrated in FIGS. 6 and 7. In some embodiments, the process can use hash-based message authentication codes (HMAC). The challenge-response scheme can be configured so that a challenge can be generated using fewer computations than would be required to solve the challenge. The fraud prevention system can be configured to determine a number of computations which may be required to compute a response. Depending on the requests, the challenge may require user computing systems with low confidence levels to execute a larger number of computations to generate a response than that of a user computing system with higher confidence levels. A confidence level can be indicative of the likelihood that a client computing system 110 is a legitimate user computing system 102 or that the client computing system is an illegitimate system. The fraud prevention system can be configured to reduce the number of requests that an illegitimate computing system can perform by requiring computing a response to the challenge each time, though it may not eliminate the illegitimate requests it can significantly reduce the number of requests that can be generated.

FIG. 6 illustrates an embodiment of a flowchart 600 for generation of a cryptographic challenge. The process 600 can be implemented by any server-type system that can communicate with a client system for detecting unauthorized actions associated with a user account for a game application in a network-based environment. For example, the process 600, in whole or in part, can be implemented by a fraud prevention system 130, a model generation system 132, an account information aggregation system 134, an account analysis system 136, an interactive computing system 120, an application host system 122, or other computing system. Although any number of systems, in whole or in part, can implement the process 600, to simplify discussion, the process 600 will be described with respect to particular systems. Further, although embodiments of the process 600 may be performed with respect to with respect to variations of systems comprising various game application environments, to simplify discussion, the process 600 will be described with respect to the interactive computing system 120.

At block 602, a fraud prevention system can determine a target sum of keys N, a maximum variation from the sum E, and an arbitrary number S. The target sum of keys N can be determined based on a target number of computations that a client computing system 110 performs in order to compute a response to a cryptographic challenge. The target number of computations may be based on a confidence level associated with a client computing system 110. The maximum variation E relative to the target sum of keys N is a factor affecting the number of rounds the process loops between blocks 706 and 718. The length of the arbitrary number S can be based on the length of the key of an HMAC function. Both the target sum of keys N and the maximum variation E can be random numbers. Random numbers may be generated using hardware or software methods. For example, a hardware circuit may generate a random number based on thermal noise. Pseudorandom number generators in software may be used to generate random numbers as well. In this disclosure, random numbers may refer to true random numbers, pseudorandom numbers, or both. Similarly, a randomly-generated number may be generated through a pseudorandom method. The value of the arbitrary number S may be zero or another arbitrary value.

At block 604, the fraud prevention system may generate a message M. The message M may have an arbitrary, pre-determined size. The message M may or may not be a random number. The server also initializes a round number R to zero.

Block 606 through block 618 are within a loop. The loop may be executed multiple times. A particular execution of the loop is designated by the round number R. At block 606, the server can generate a random key K with a value between zero and the current value of the sum of keys N.

At block 608, the fraud prevention system can subtract the value of key K from the current value of the sum N of keys. The new value of the sum N is used at block 606 in the next round, if there is a next round. At block 610, the fraud prevention system can compute a digest D of the message M using key K. The digest D can be computed using an HMAC. Examples of HMAC include HMAC-SHA1, HMAC-SHA256, HMAC-MD5, and the like. The digest D can also be computed using a symmetric-key algorithm where lengths of message M and digest D can be the same. Examples of symmetric-key algorithm include Advanced Encryption Standard (AES), Triple Data Encryption Algorithm (TDES or 3DES), Blowfish, and the like. At the interactive computing system 120, message M can be the input to the symmetric-key algorithm; the digest D can be the output from the symmetric-key algorithm. The symmetric-key algorithm may operate in either encryption or decryption mode in the interactive computing system 120. The user computing system 102 can operate the symmetric-key algorithm in the inverse mode to compute a message M (as an output) from a digest D (as an input). For example, if the interactive computing system 120 operates AES in encryption mode to compute a digest D, the user computing system can operate AES in decryption mode to compute a corresponding message M. The digest D can also be referred to as a message authentication code (MAC).

At block 612, the fraud prevention system can generate a new message M. The value of the new message M can be dependent on the current value of key K and the current value of the message M. At block 614, the fraud prevention system can generate a new value of S. The new value of S can be dependent on the current value of key K and the current value of S. At block 616 the fraud prevention system can compute another digest F. The digest F can be a digest of the round number R using the new value of S as the key. The digest can be computed using an HMAC, for example, the same HMAC used to compute the digest D (or a different HMAC). At block 618, the fraud prevention system can compare the current value of the sum of keys N with the maximum variation E. If the current value of the sum of keys N is not less than the maximum variation E, the loop continues through block 622, where the round number R can be incremented by one. The loop then repeats from block 606. The current values of key K and message M (of round R−1) becomes the immediately previous values of key K and message M (of round R), respectively. Thus, at block 610 of the next round, the message M is based on the immediately previous values of key K and the immediately previous value of the message M.

If the current value of the sum of keys N is less than the maximum variation E at block 618, the server can exit the loop and continue to block 620. At block 620, the fraud prevention system can send the final value of the digest F, the initial value of the message M, the values of all rounds of the digest D, and a variable-length random buffer to the client as a cryptographic challenge. The variable-length random buffer will be described further in connection with FIG. 9B. In some embodiments, the fraud prevention system may provide only the initial value of the message M and the values of all rounds of the digest D as a cryptographic challenge. The final value of the digest F and/or the variable-length random buffer can be optional elements in the cryptographic challenge.

While FIG. 6 illustrates an embodiment using HMAC, other cryptographic algorithms with the desired properties as described above may be used instead, for example, a cipher-based message authentication code (CMAC), or a message authentication code (MAC) more generally. A digest of a MAC (for example, HMAC, CMAC, or MAC in general) may itself be referred to as an MAC (or HMAC, CMAC). Other variations of the algorithm may also be implemented. For example, one more round of HMAC digest D can be computed between block 618 and 620 to make the actual sum of keys through all rounds equal to the target sum of keys N. As another example, in embodiments wherein the cryptographic challenge does not include the final value of digest F, the number S, the round number R, and block 616 may be omitted from the flow. Some blocks within the loop may be re-ordered, for example block 616 may be placed before block 614. Some embodiments may modify block 612 (for select rounds, not necessarily all rounds) such that the new message M is generated based on a previous value of key K instead of the current value of key K and/or a previous value of the message M instead of the current value of the message M. Similarly, some embodiments may modify block 614 (for select rounds, not necessarily all rounds) such that the new value of S is generated based on a previous value of key K instead of the current value of key K and/or a previous value of S instead of the current value of S. Some embodiments may modify block 612 such that the new message M is generated based on a current or previous value of key K and not based on a current or previous value of the message M. Similarly, some embodiments may modify block 614 such that the new value of S is generated based on a current or previous value of key K and not based on a current or previous value of S.

VII. Generating Responses

FIG. 7 illustrates an embodiment of a flowchart 800 for a client computing system 110 to compute a response to a challenge from an interactive computing system 120 or an application host system 122. In addition to the attributes of the challenge-response scheme described in connection with FIG. 6, one additional or alternative attribute of the system can be that a client cannot perform any (or a significant amount of) computations to assist in computing a response to a challenge prior to receiving the challenge. Another additional or alternative attribute can be that the computations performed for a prior challenge do not assist in computing a response to a current challenge. Another additional or alternative attribute can be that the total amount of computations (for example, measured in real CPU time) which may be required to compute a response may be configured to account for computing systems using a plurality of systems, cores, threads, and other processing resources to perform the computations. Another additional or alternative attribute can be that the computations performed by one user computing system in response to one challenge do not assist in the computations which may be required by another client in response to a different challenge. Without a known shortcut which works consistently to reduce the average computation time which may be required to compute a response, a client may have no better algorithm to execute than what is provided with game application 104 or host application 106, an embodiment of which is illustrated in FIG. 7.

The process 700 can be implemented by any client system that can communicate with a server system for detecting unauthorized actions associated with a user account for a game application in a network-based environment. For example, the process 700, in whole or in part, can be implemented by a fraud prevention system 130, a model generation system 132, an account information aggregation system 134, an account analysis system 136 and an interactive computing system 120, an application host system 122, or other computing system. Although any number of systems, in whole or in part, can implement the process 700, to simplify discussion, the process 700 will be described with respect to particular systems. Further, although embodiments of the process 700 may be performed with respect to with respect to variations of systems comprising various game application environments, to simplify discussion, the process 700 will be described with respect to the client computing system 110 or client.

At block 702, a client may receive the final value of digest F, the initial value of message M, the values of all rounds of digest D, and a variable-length random buffer from a server as a challenge. At block 704, the client can set the arbitrary number S to the same value as the server does at block 602. The client can also set the round number R to zero. At block 706, the client can initialize the value of key K to zero. Blocks 708, 710, and 722 form an inner loop for computing a correct value of key K through a brute force method. At block 708, the client can compute a digest D' of the message M using the current value of key K in the HMAC function. The HMAC function used at block 708 is the same as the HMAC function used at block 610. At block 710, the client can compare the computed digest D' with the received digest D for the current round R. If the value of digest D' and the value of digest D are the same, the current value of key K is the value of key K used in the server at block 610 to compute the value of digest D for the current round. The client can then move on to block 712. If the value of digest D' and the value of digest D are not the same, the current value of key K is not the value of key K used in the server at block 610 to compute the value of digest D for the current round. The client can loop back to block 708 through block 722 where in the value of key K is incremented by one. For example, if the server used a value of key K equal to 439,234 to compute the value of digest D for the current round, the client may compute a value of digest D' equal to the received digest D for the current round after executing the inner loop 439,235 times starting from key K equal to zero.

After finding the correct value of the digest D of the current round R, the client proceeds to block 712. The client can generate a new message M. The value of the new message M can depend on the value of key K which generated the correct value of digest D for the current round R and on the current value of the message M. At block 712, the client performs the same computations as the fraud prevention system performs block 612. At block 714, the client can generate a new value S. The new value of S can depend on the value of key K which generated the correct value of digest D for the current round R and on the current value of S. At block 714, the client performs the same computations as the server performs at block 614. At block 716, the client can compute a digest F' using an HMAC function. The HMAC function at block 716 is the same as the HMAC function at block 616. The digest F' can be computed by using the round number R as the message and the value S as the key in the HMAC function. Then at block 718, the client can compare the value of computed digest F' with the value of the received final value of digest F. If the two values are equal, the client has computed the value of keys for all rounds and may send these values to the server as a response to the challenge at block 720. In some embodiments, the response to the challenge may include only the value of the key K for the last round. In other embodiments, the response to the challenge may include the value of the key K for the last round and any combination of the following: the value of keys for any and all rounds prior to the last round, the value of the number S for any or all rounds, and/or the value of the message M for any or all rounds. If the value of computed digest F' and the value of received final value of digest F are not the same, the client loops back to block 706 through block 724, in which the round number R is incremented by one.

As shown in the FIG. 6 embodiment, the tasks are formed by the fraud prevention system and include generating random numbers, computing HMAC digests using random but known values of messages and keys, and creating dependency of successive values of message M and of the number S. These operations are computationally inexpensive because of a cryptographic property of the HMAC function, namely, it is easy to compute a digest given a message and a key. As shown in the FIG. 7 embodiment, the operations performed by the client comprise computing unknown values of a key given a message and a digest computed using an HMAC function. These operations are computationally expensive and have no known shortcuts. Thus, it may not be feasible to reduce the total computation time even if a large number of computing resources are available. Furthermore, through the use of successive values of message M and number S whose current values depend on their respective previous values, the embodiment can make it impractical for different computers to divide up the task, for example, through distributing different rounds to different computers.

VIII. Varying Number of Rounds

As described above, one attribute of a challenge-response algorithm may include an ability to configure a target amount of time which may be required for a client computing system 110 to compute a response. The target length of time to compute a response may be estimated with knowledge of the algorithm and the processing capability of a client computing system 110. A server may have information on a client computing system 110 in hardware information 228 as described in relation to FIG. 2. A server may adjust the algorithm parameters based on hardware information associated with a client computing system 110 to achieve a desired length of response time. For example, a client computing system 110 with a slow single core processor can be given a challenge which may require fewer computations to generate a response then a user computing system with a fast multicore processor. The target response time for the slow and the fast systems can be made approximately the same by modifying the challenges provided to each system.

Additionally, in some embodiments, a client computing system 110 with a high confidence level may be given challenges that can require a shorter time to compute responses. A client computing system 110 with a low confidence level may be given challenges that can require a longer time to compute responses. For example, the fraud prevention system may generate a challenge whose response can take 30 seconds to compute for a client computing system 110 with a low confidence level, and may generate a challenge whose response can take one second to compute for another client computing system 110 with a high confidence level. It may not be necessary, however, to ensure that a client computing system 110 with a low confidence level spend exactly 30 seconds (to use the same number in the above example) to compute a response, or that a client computing system 110 with a high confidence level spend exactly one second to compute a response. A goal of some embodiments can be achieved by requesting a client computing system with a low confidence level to spend much more time in computing a response than a user computing system with a higher confidence level. As described above, users operating multiple parasitic computing systems 108 may generate thousands of requests every second. Slowing down requests from such a user to a few requests every second using the same group of systems or forcing such a user to deploy thousands times more systems to generate thousands of requests every second, for example, can significantly reduce the rate at which the parasitic computing systems can make requests.

Figure 8A:
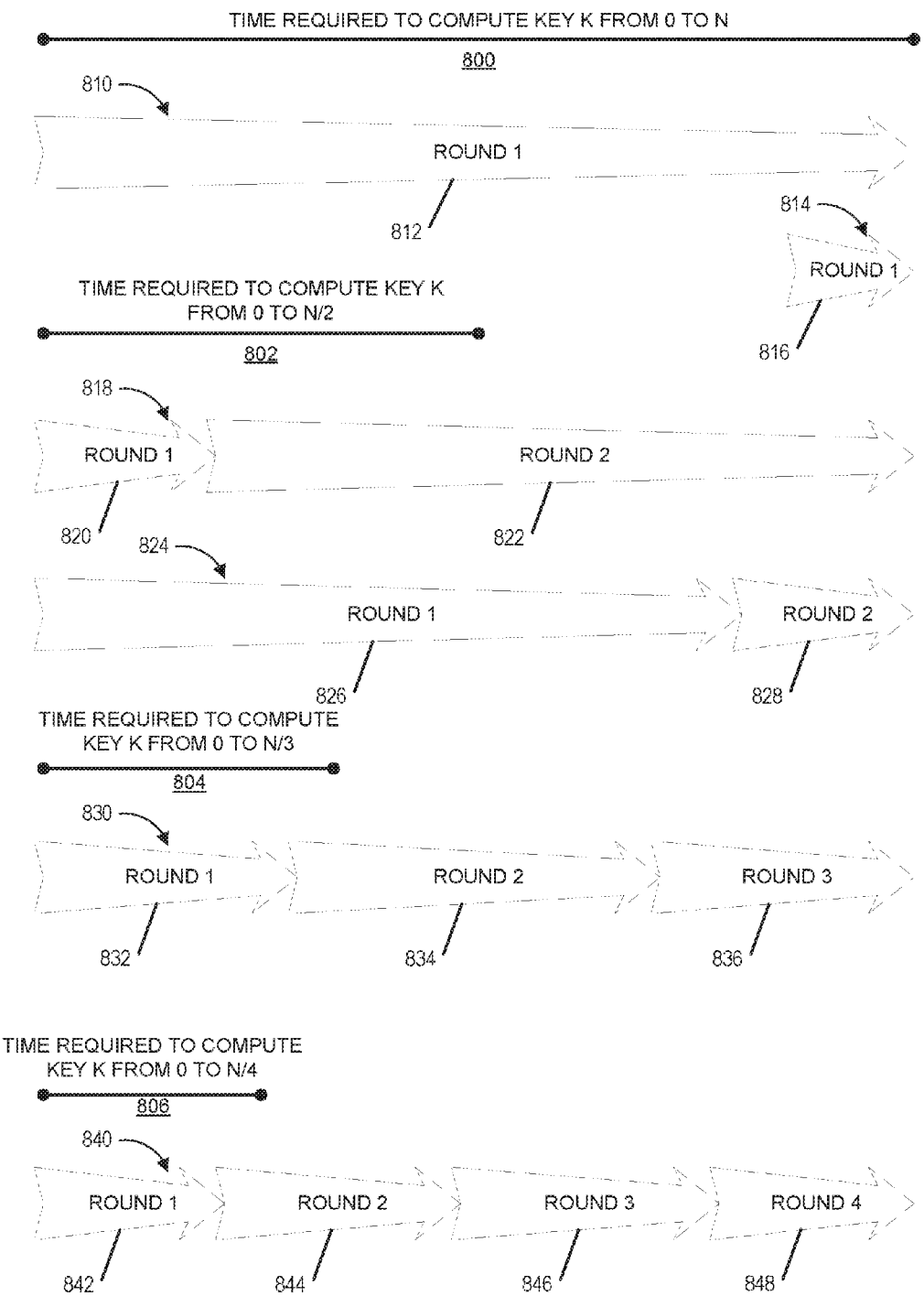
FIG. 8A illustrates examples of client computation timelines.

FIG. 8A illustrates an embodiment of the process for requiring the client to perform a target amount of computations to compute a response to a cryptographic challenge. To illustrate, the value of an HMAC key is arbitrarily chosen to be an integer N in the server. This integer N can approximate a target number of rounds a client may need to iterate the inner loop (blocks 708, 710, and 722) to compute a valid response to a challenge. Because of the difficulty in computing the value of an HMAC key from a message and its corresponding digest, a client can be expected to perform a certain number of computations to brute force the value of key from zero to N. This target number of computations (or target amount of time) is illustrated as line 800 and arrow 812. Similarly, a client can be expected to perform half the computations to brute force the value of key from zero to N/2, as illustrated via line 802. Lines 804 and 806 similarly illustrate the target amount of time to brute force the value of key starting from zero to N/3 and N/4, respectively. Without knowing the value of a key or its approximate order of magnitude, a client may, on average, take as much time to generate a correct response starting from a key value of zero as starting from any other value using a brute force method. A client can take an amount of time to reach a key value of N as illustrated by arrow 812. However, if a client can estimate or discover the approximate target amount of time (or the approximate target number of computations) it is expected to spend on computing the value of key (for example, the length illustrated by line 800), or the order of magnitude of N, the client may begin its brute force method with a key value closer to N, for example, closer to and smaller than N. In this way, the client may significantly reduce the amount of time needed brute force the value of key. This can be illustrated by arrow 816. The length of arrow 816 is significantly shorter than the length of arrow 812. If a client is able to estimate or discover the approximate value of N with a high degree of accuracy, the client can reduce the amount of time needed to compute a response to a challenge even more significantly than the visual representations of arrow 816 versus arrow 812.

A sophisticated user behind an parasitic computing system 108 may be able to estimate the approximate value of N or at least its order of magnitude in the simple scenario represented by line 800. Such a user may be able to monitor the operations of parasitic computing system 108 or estimate the approximate amount of computations performed to compute a response to a cryptographic challenge. A crude estimate can be derived with knowledge of the hardware capability (for example, processor speed) of an parasitic computing system 108 and the length of time the computing system takes to compute a response. Varying the value of N or the length of line 800 by a large amount may combat this workaround. However, doing so has some disadvantages, for example, large variations in client response time.

Figure 8B:
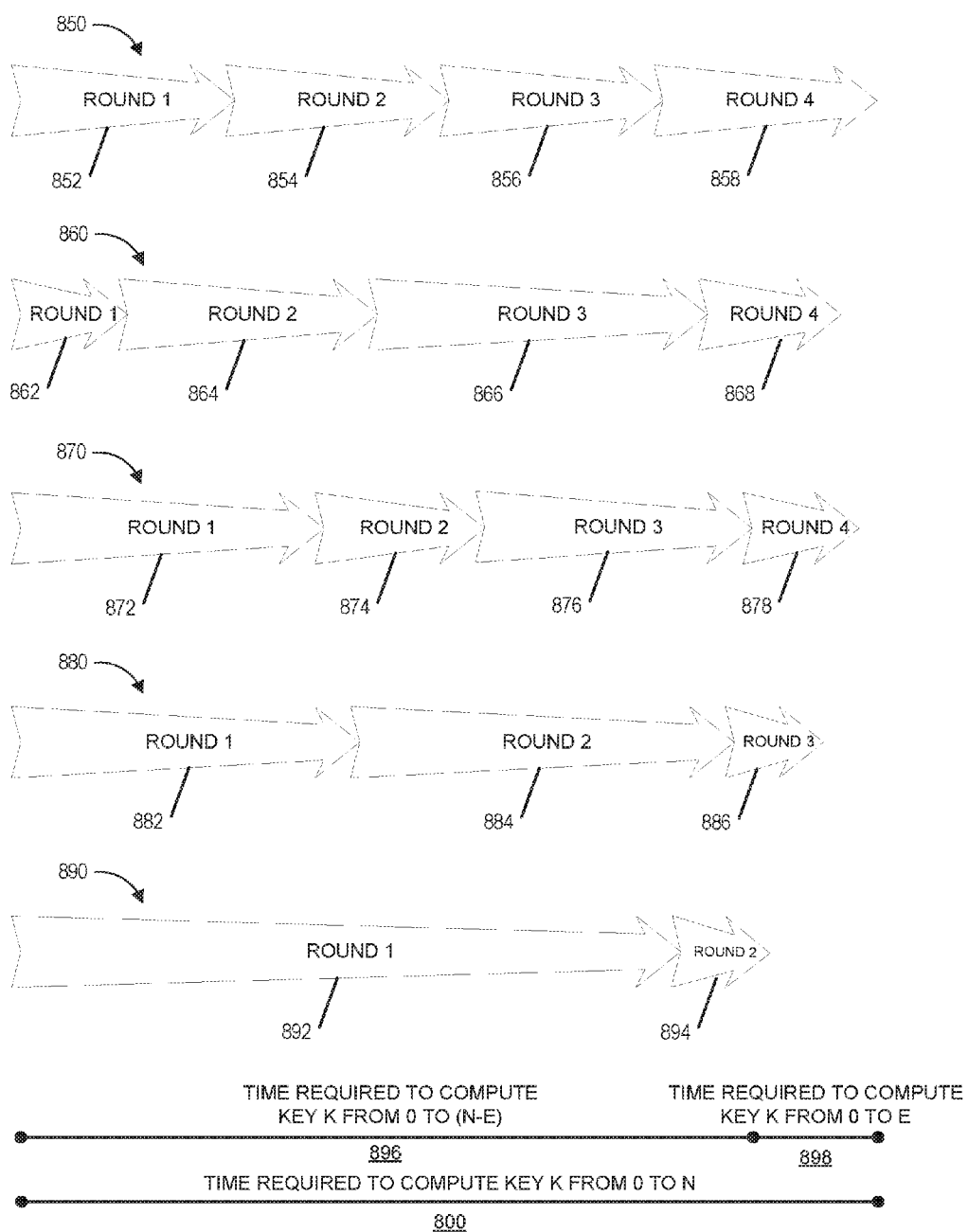
FIG. 8B illustrates examples of client computation timelines.

Some embodiments can eliminate this shortcut by using multiple rounds of HMAC computation, each with a random value of key K. To illustrate, consider the arrow sets 818 and 824. In both arrow sets, there are two rounds of computations, two values of keys, two messages, and two digests. The values of keys for the first round are randomly generated. In set 818, the value of the first key happens to be small as illustrated with arrow 820. In set 824, the value of the key for the first round happens to be large, as illustrated with arrow 826. In both arrow sets 818 and 824, the values of keys of the two rounds add up to be N. Thus, the total amount of time for a client to brute force both keys for the two rounds remain the same as the time which may be required in a single round case illustrated by arrow 812. However, even if a client can estimate or discover the total amount of time as represented by line 800, the shortcut as described above may not be effective for round one because the key value for round one may be anywhere between zero and N—small or large. Using the above-described shortcut and starting with a large number for the key value may save computation time in situations similar to that represented by arrow set 824, but may not save computation time in situations similar to that represented by arrow set 818. In the later scenario, in fact, the shortcut may result in spending more time to reach the right value for the first round, if the shortcut starts with round one at a value larger than the value represented by arrow 820. Thus, on average, the shortcut may not save computation time. But the shortcut may not be eliminated for the second round because once a client correctly computes the key value for round one, with the knowledge of the total amount of target time, it may then estimate the approximate value of the key for round two. Thus in the arrow set 818, a client may take a shortcut for round two and save well over half the time. In the arrow set 824, a client may take a shortcut for round two and save less than half the time. Since the value of the key for round one is randomly generated, on average the client may save as much as half of the computation time through the shortcut. In the two-round scenario, then, the shortcut may reduce the average minimum amount of computations that an parasitic computing system 108 can perform to compute the value of keys for both rounds to approximately half of the target amount of computations. However, by increasing the number of rounds, the average time saving through the shortcut can be reduced, for example, to approximately one third for three rounds (as illustrated through arrow set 830) and to approximately one fourth for four rounds (as illustrated through arrow set 840 and so forth). An embodiment may increase the number of rounds to reduce the average time saving achieved through the shortcut. For example, the fraud prevention system may include any number of rounds, such as 10, 20, 30, or 100 rounds, or any other number IX. Concealing the Number of Rounds FIG. 8B is an embodiment of a timeline illustration that uses a small number of rounds (2 to 4) for illustrative purposes only. The total target time for a client to generate a response to a challenge is the target length of time to compute a key value via brute force method from zero to N, as illustrated through line 800. Arrow set 850 illustrates a scenario where the key for all four rounds is equal to N/4. Arrows 852 through 858 have the same length because it takes the same amount of time to brute force from zero to N/4 for each round. Arrow set 850 illustrates the shortcoming of having a predictable value of key. A client may take the shortcut as illustrated via arrow 816 but scale and apply the shortcut to each of the rounds in arrow set 850. Arrow sets 860 and 870 illustrate how computation time for each round can appear unpredictable when the values of the keys are randomly generated. Therefore, it may not be feasible for a client to take the shortcut as described above.

However, as also described above, a client may be able to take a shortcut for the final round if the client is able to estimate or discover the approximate target length of time to compute a response and the number of rounds (for example, 4 in the arrow sets 860 and 870). To further eliminate this shortcut, an embodiment of the fraud prevention system can incorporate a randomly regenerated maximum variation E to vary the number of rounds. The maximum variation E can be much smaller than the number N. The maximum variation E can be used to change the minimum number of rounds a client may be forced to iterate the inner loop (blocks 708, 710, and 722) to compute a valid response, and to affect variability in the number of rounds. For each of the arrow sets 870, 880, and 890, the total target amount of time to compute a response is the same as the target time to brute force the key from zero to N, illustrated through line 800. The maximum variation E is used as a terminating condition. If the sum of the values of keys of all prior rounds and the current round is less than N by an amount less than the maximum variation E, the current round can be the last round. To illustrate, consider the lines 800, 896, and 898, and arrow sets 870, 880, and 890. Line 896 represents the target length of time to brute force the value of key from zero to (N-E). Line 898 represents the target length of time to brute force the value of key from zero to E. The total length of the two lines 896 and 898 is equal to the length of line 800 which represents the target length of time to brute force the value of key from 0 to N. After two rounds, arrow set 890 has an amount of computation time longer than the line 896. Thus, round two can be the final round for arrow sets 890. After two rounds, neither arrow set 870 nor arrow set 880 has reached a length of time longer than that represented by line 896. Thus, round two represented by arrows 874 and 984 is not the final round for these two sets. After the third round, arrows 882, 884, and 886 together exceed the length of line 896. Thus, the third round can be the final round for arrow set 880. Arrows 872, 874, and 876 together, on the other hand, are still shorter than line 896. Thus, round three is not the final round for arrow set 870. For arrow set 870, only after four rounds does the time represented by arrows 872, 874, 876, and 878 become longer than the length represented by line 896. Therefore, round four can be the final round of arrow set 870. The number E represents the maximum variation from the target amount of computations N because, using a brute force method, a client is forced to spend at least (N-E) amount of computations to compute a valid response to a challenge.

A client may not have the value of maximum variation E or, prior to reaching block 720, the total number of rounds, however. Thus the embodiment illustrated in FIGS. 6 and 7 computes an additional digest F (or F') using a round number R and a number S. A client is provided with information on the initial values of the round number R and the number S, as well as the way to update their values for each successive round. Thus, a client can compute a digest F' through the rounds (at block 716) matching a digest F a server can compute (at block 616) through the rounds. Through the use of a variable number of rounds R, that are unknown to a client through at least most of the process illustrated in FIG. 7, a client may not know it has reached the final round until after it has brute forced the final round and matched its computed digest F' with the received final digest F in block 718 in FIG. 7. Thus, a client may not be able to take a shortcut even for the final round as described above in connection with FIG. 8A.

Since the values of the keys are randomly generated, the number of rounds can be affected by the value of maximum variation E relative to the value of N. To illustrate, if the value of maximum variation E is equal to N/2, there is a 50% probability that a challenge/response would only involve one round, since a randomly generated key between the range of zero and N has equal probability of being larger or smaller than N/2. If the value of maximum variation E is equal to N/3, there is a 33.3% probability that a challenge/response would only involve one round, since a randomly generated key between the range of zero and N has one-third probability of being larger than N*2/3, the length of (N−E). Thus, there is a higher probability that a maximum variation E value of N/3 would produce more rounds than a maximum variation E value of N/2. More generally, a smaller maximum variation E value is more likely to produce a larger number of rounds. The value of maximum variation E is a simple fraction of N in these illustrations for ease of description. A typical implementation according to the present disclosure can likely use a value of maximum variation E much smaller than, and having no obvious relationship (for example, a simple fraction) to, the value of N.

But with randomly generated values of key K and a terminating criterion that is based on the sum of key values (sum of random numbers), the number of rounds can be highly variable, for example, there is a non-zero probability that the number of rounds can be very large (if all generated random keys happens to be small relative to N). To eliminate the effect of this uncertainty, an embodiment may limit the number of rounds to some value. For example, a large number of rounds implies a long message from a server to a client, the message including the values of digest D for all rounds, as well as a large amount of memory for storing variables associated with the challenge-response algorithm. The message from a server to a client, including values of digest D for all rounds, can then be limited to a corresponding maximum length. The variable-length random-number buffer at block 620 in FIG. 6 is used to fix the length of the challenge to this corresponding maximum length when the number of actual rounds is smaller than the limit on the number of rounds, thereby concealing the number of actual rounds in a challenge. By making the number of rounds variable and not disclosing it to a client, an embodiment of the present disclosure can make it difficult for a client to take the shortcut described above even for the final round.

X. Process for Fraud Prevention in a Game Application

Figure 9:
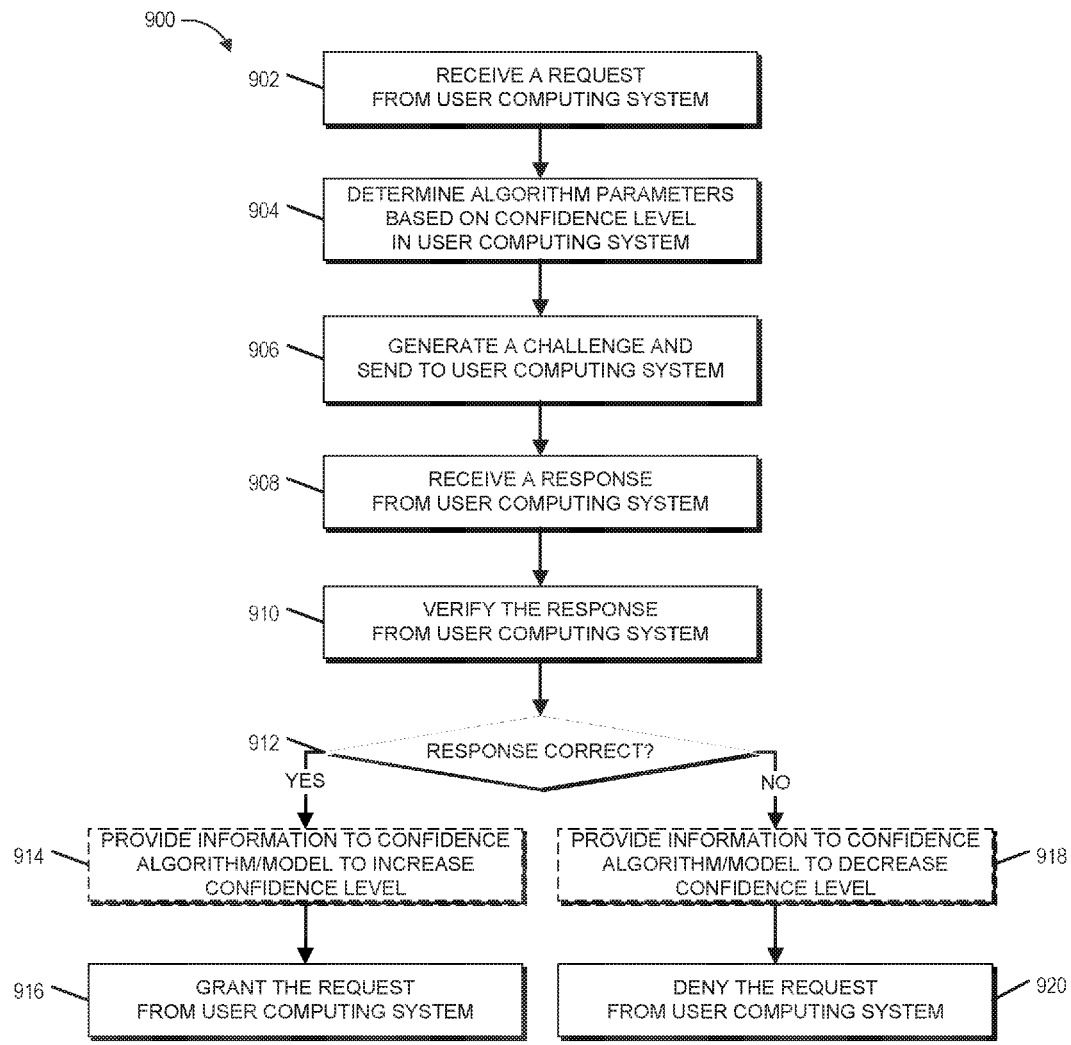
FIG. 9 illustrates an embodiment of a process for a server processing according to one embodiment of a fraud detection system.

FIG. 9 illustrates an embodiment of a flowchart for a process for fraud prevention of a user account in a game application. The process 900 can be implemented by any server-type system that can communicate with a client system for detecting unauthorized actions associated with a user account for a game application in a network-based environment. For example, the process 900, in whole or in part, can be implemented by a fraud prevention system 130, a model generation system 132, an account information aggregation system 134, an account analysis system 136, an interactive computing system 120, an application host system 122, or other computing system. Although any number of systems, in whole or in part, can implement the process 900, to simplify discussion, the process 900 will be described with respect to particular systems. Further, although embodiments of the process 900 may be performed with respect to with respect to variations of systems comprising various game application environments, to simplify discussion, the process 900 will be described with respect to the interactive computing system 120.

At block 1002, the interactive computing system 120, may receive a request from a client computing system 110. The request can include identification information associated with the client computing system and/or a user account associated with the game application.

At block 904, the interactive computing system 120 can determine algorithm parameters based on a confidence level in the client computing system 110 making the request. A confidence level may be determined as described above in connection with FIG. 3. The confidence level may be determined using a fraud prevention model. In some embodiments, the confidence level may be based on information associated with the user account and/or the computing system making the request. The confidence level may be a series of thresholds for determining categories of users. In some embodiments, the confidence level may be a value, such as for example, between 0 and 100, that can be used as a factor in determining algorithm in parameters. Each category of users may be associated with different algorithm parameters.

At block 906, the interactive computing system 120 may generate a cryptographic challenge based on the algorithm parameters determined at block 904, the cryptograph challenge. The interactive computing system 120 can send the challenge to the client computing system 110. At block 908 the interactive computing system 120 may receive a response to the challenge from the client computing system 110.

At block 910, the interactive computing system 120 can verify the response received from the client computing system 110. At block 912, the interactive computing system 120 can determine whether the response received from the client computing system 110 is correct. If the response is correct, the computing system proceeds to block 914.

At block 914 optionally, the interactive computing system 120 may increase the confidence level associated with the client computing system 110. For example, by providing information regarding the correct response from the client computing system 110 to a confidence algorithm/model.

At block 916, the interactive computing system 120 can grant the request from the client computing system 110. If, on the other hand, the interactive computing system 120 determines the response to be incorrect at block 912, the flow proceeds to block 918.

At block 918 optionally, the interactive computing system 120 may decrease the confidence level associated with that client computing system 110, for example, by providing information regarding the incorrect response from the client computing system to a confidence algorithm/model. At block 1020, the interactive computing system 120 may deny the request from the client computing system 110.

The blocks 1014 and 1018, increasing or decreasing a confidence level associated with a client computing system, may be performed through the fraud prevention system 130. For example, the correctness of a response to a cryptographic challenge may become a part of historical data 152. A confidence level associated with a client computing system 110 may also be adjusted, for example, by account analysis system 136. As another example, a confidence level associated with a client computing system 110 may be determined in part based on user account information 220, for example, whether a user accounts is a verified account, whether user information 226 includes a valid credit card number, and the like.

XI. Process Flow in User Computing System

Figure 10:
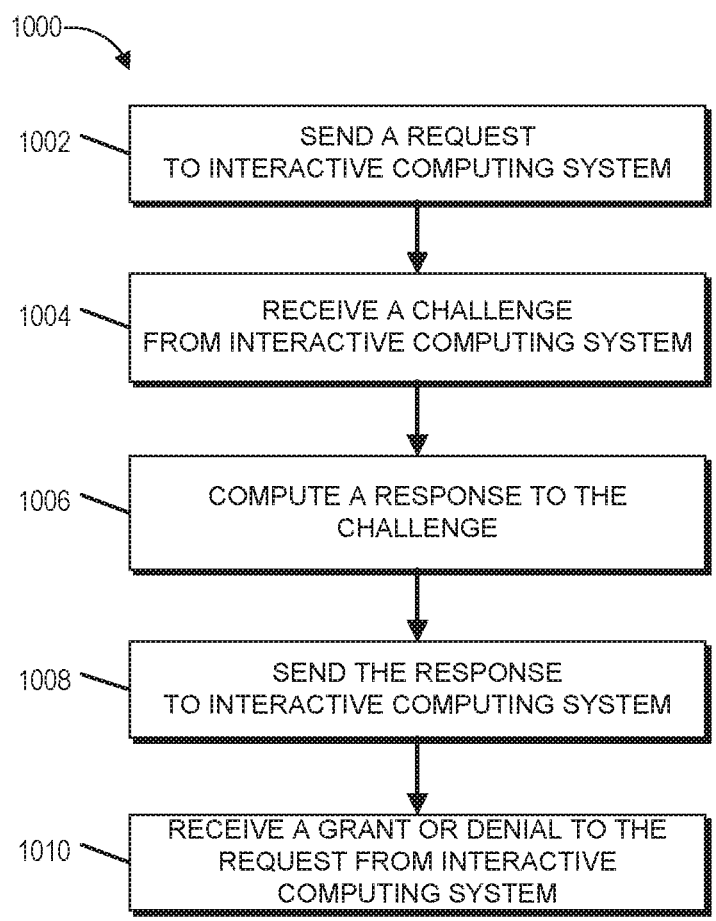
FIG. 10 illustrates an embodiment of a process for a client processing according to one embodiment of a fraud detection system.

FIG. 10 shows an exemplary flowchart 1000 of processing blocks at a client computing system 110. At block 1002, a client computing system 110 may send a request to an interactive computing system 120. At block 1004, the client computing system 110 may receive a cryptographic challenge from the interactive computing system 120. At block 1006, the client computing system 110 can compute a response to the challenge received from interactive computing system 120. At block 1008, the client computing system 110 can send the response to the interactive computing system 120. At block 1010, the client computing system 110 may receive a grant of the request from the interactive computing system 120, if the response is correct. If the response is not correct, the client computing system 110 may receive a denial of the request.

XII. Overview of Computing Device

Figure 11:
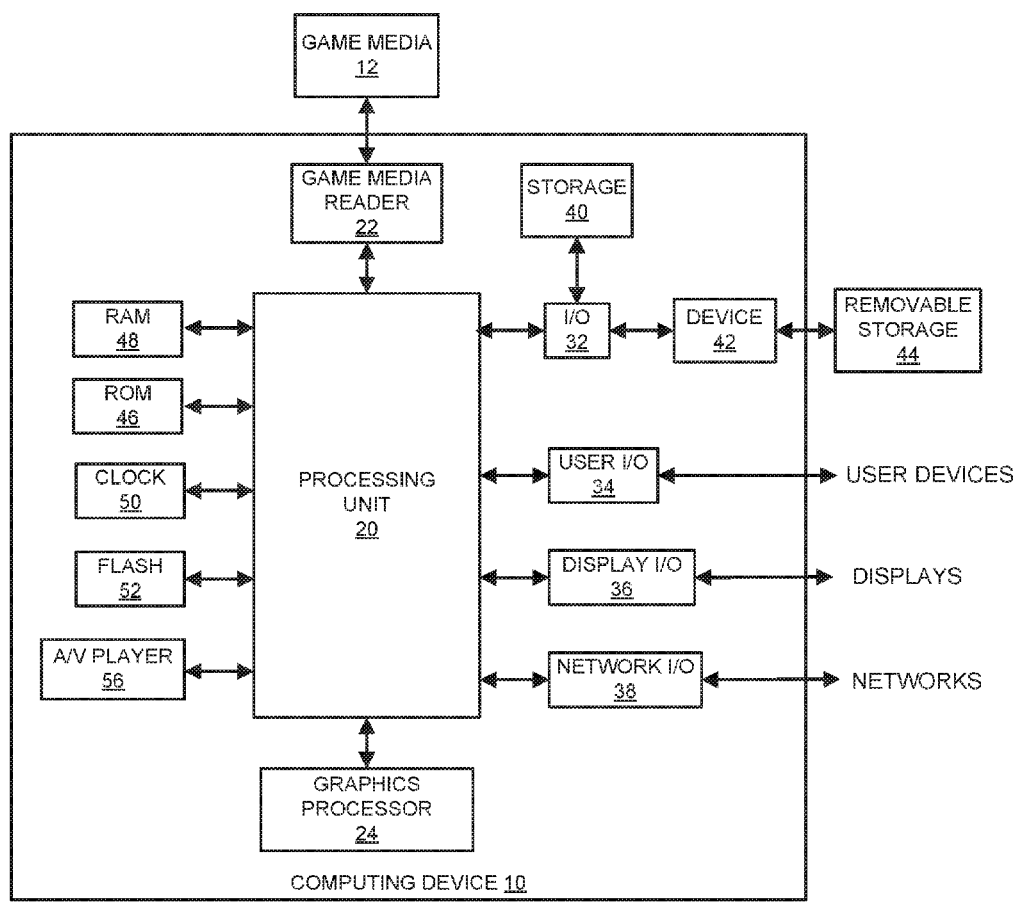
FIG. 11 illustrates an embodiment of a computing device.

FIG. 11 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud prevention is performed.

User I/O 34 is used to send and receive commands between processing unit 20 and user devices, such as game controllers. In some embodiments, the user I/O can include a touchscreen input. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud prevention, and/or generation of a fraud detection model.

Display output signals produced by display I/O 36 comprise signals for displaying visual content produced by computing device 10 on a display device, such as graphics, user interfaces, audio, video, and/or other audio-visual content. Computing device 10 may comprise one or more integrated displays and/or speakers configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
a memory configured to store computer-executable instructions;
a communication component circuitry for communicating over a communication network with a client computing device; and at least one processor, wherein the computer-executable instructions, when executed, configure the at least one processor to:
receive a request from the client computing device through the communication network;
assign a confidence level to the client computing device based at least in part on identification information associated with at least one of the client computing device or a user account associated with the request;
determine a target amount of computations for the client computing device to compute a response based at least in part on the confidence level assigned to the client computing device, and wherein the system selects parameters used to generate a cryptographic challenge based at least in part on the target amount of computations for the client computing device;

generate an ordered plurality of secret keys;

generate an ordered plurality of messages;

generate a first ordered plurality of message authentication codes, wherein each message authentication code is generated from a corresponding key of the ordered plurality of secret keys and a corresponding message of the ordered plurality of messages, wherein each message after a first message of the ordered plurality of messages is generated based at least in part on a secret key of the ordered plurality of secret keys used to generate a previous message authentication code of the ordered plurality of message authentication codes;

generate the cryptographic challenge, wherein the cryptographic challenge comprises the first message and the ordered plurality of message authentication codes;

transmit the cryptographic challenge to the client computing device through the communication network;

receive a challenge response to the cryptographic challenge from the client computing device through the communication network;

determine whether the challenge response includes at least a determined secret key of the ordered plurality of secret keys used to generate a determined message authentication code of the ordered plurality of message authentication codes; and transmit a request response to the request to the client computing device through the communication network based, at least in part, on a result of the determination.

2. The system of claim 1, wherein each of the message authentication codes is a hash-based message authentication code (HMAC).

3. The system of claim 1, wherein a message after the first message from which a message authentication code in the first ordered plurality of message authentication codes after the first message authentication code is further generated based at least in part on a message used to generate a previous message authentication code in the first ordered plurality of message authentication codes.

4. The system of claim 1, wherein the system generates random or pseudorandom secret keys.

5. The system of claim 1, wherein a number of message authentication codes in the first ordered plurality of message authentication codes is a variable number within a determined range.

6. The system of claim 5, wherein the cryptographic challenge sent from the system has a length independent of the configurable number of message authentication codes in the first ordered plurality of message authentication codes.

7. The system of claim 6, wherein the cryptographic challenge comprises a fixed length of data to contain the first ordered plurality of message authentication codes, and wherein a portion of the data with the fixed length unoccupied by the first ordered plurality of message authentication codes is filled with random or pseudorandom numbers.

8. The system of claim 1, wherein each message authentication code in the first ordered plurality of message authentication codes after the first message authentication code is generated from a secret key of the ordered plurality of secret keys and a message of the ordered plurality of messages wherein the message is generated based at least in part on the secret key used to generate an immediately previous message authentication code in the first ordered plurality of message authentication codes.

9. The system of claim 1, wherein the message from which the first ordered plurality of message authentication codes is generated after the first message is further generated based at least in part on a message of the ordered plurality of messages used to generate an immediately previous message authentication code in the first ordered plurality of message authentication codes.

10. The system of claim 1, wherein the cryptographic challenge further comprises a final message authentication code in a second ordered plurality of message authentication codes, and wherein:

a first message authentication code in the second ordered plurality of message authentication codes is generated from a first secret key and a first message; and each message authentication code in the second ordered plurality of message authentication codes after the first message authentication code in the second ordered plurality of message authentication codes is generated from a secret key and a message, wherein the secret key is generated based at least in part on a secret key used to generate a current or a previous message authentication code in the first ordered plurality of message authentication codes.

11. The system of claim 10, wherein the client computing device terminates computations of a response to the cryptographic challenge when the client computing device computes a value which matches the final message authentication code in the second ordered plurality of message authentication codes.

12. The system of claim 10, wherein a key after the first key from which a message authentication code in the second ordered plurality of message authentication codes after the first message authentication code is generated is further generated based at least in part on a key of the ordered plurality of secret keys used to generate a previous message authentication code in the second ordered plurality of message authentication codes.

13. A computer-implemented method comprising:

receiving a request from a client computing device through a communication network;

assigning a confidence level to the client computing device based at least in part on identification information associated with at least one of the client computing device or a user account associated with the request;

determining a target amount of computations for the client computing device to compute the response based at least in part on the confidence level assigned to the client computing device, and wherein the system selects parameters used to generate a cryptographic challenge based at least in part on the target amount of computations for the client computing device;

generating an ordered plurality of secret keys;

generating an ordered plurality of messages;

generating an ordered plurality of message authentication codes, wherein each message authentication code is generated from a corresponding key of the ordered plurality of secret keys and a corresponding message of the ordered plurality of messages, wherein each message after a first message of the ordered plurality of messages is generated based at least in part on a secret key of the ordered plurality of secret keys used to generate a previous message authentication code of the ordered plurality of message authentication codes;

generating the cryptographic challenge, wherein the cryptographic challenge comprises the first message and the ordered plurality of message authentication codes;

transmitting the cryptographic challenge to the client computing device through the communication network;
receiving a challenge response to the cryptographic challenge from the client computing device through the communication network;
determining whether the challenge response includes at least a determined secret key of the ordered plurality of secret keys used to generate a determined message authentication code of the ordered plurality of message authentication codes; and
transmitting a request response to the request to the client computing device through the communication network based, at least in part, on a result of the determination.

14. A non-transitory computer readable medium comprising computer-executable instructions that, when executed by a computing system, cause the computing system to:
receive a request from a client computing device through a communication network;
assign a confidence level to the client computing device based at least in part on identification information associated with at least one of the client computing device or a user account associated with the request;
determine a target amount of computations for the client computing device to compute a response based at least in part on the confidence level assigned to the client computing device, and wherein the system selects parameters used to generate a cryptographic challenge based at least in part on the target amount of computations for the client computing device;
generate the cryptographic challenge, wherein the cryptographic challenge comprises a first message and an ordered plurality of message authentication codes, wherein each message authentication code is generated from a corresponding secret key of an ordered plurality of secret keys and a corresponding message of an ordered plurality of messages, wherein each message after the first message is generated based at least in part on a secret key of the ordered plurality of secret keys used to generate a previous message authentication code of the ordered plurality of message authentication codes;
transmit the cryptographic challenge to the client computing device through the communication network;
receive a challenge response to the cryptographic challenge from the client computing device through the communication network;
determine whether the challenge response includes at least a determined secret key of the ordered plurality of secret keys used to generate a determined message authentication code of the ordered plurality of message authentication codes; and
transmit a request response to the request to the client computing device through the communication network based, at least in part, on a result of the determination.

15. The computer readable medium of claim 14, wherein the cryptographic challenge comprises a fixed length of data to contain the plurality of message authentication codes, and wherein a portion of the data with the fixed length unoccupied by the plurality of message authentication codes is filled with random or pseudorandom numbers.

* * * * *